United States Patent
Sasai

(10) Patent No.: US 11,126,435 B2
(45) Date of Patent: Sep. 21, 2021

(54) BRANCH DESTINATION PREDICTION BASED ON ACCORD OR DISCORD OF PREVIOUS LOAD DATA FROM A DATA CACHE LINE CORRESPONDING TO A LOAD INSTRUCTION AND PRESENT LOAD DATA

(71) Applicant: Renesas Electronics Corporation, Tokyo (JP)

(72) Inventor: Masanao Sasai, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 152 days.

(21) Appl. No.: 15/916,035

(22) Filed: Mar. 8, 2018

(65) Prior Publication Data
US 2018/0341492 A1    Nov. 29, 2018

(30) Foreign Application Priority Data

May 26, 2017    (JP) .............................. JP2017-104652

(51) Int. Cl.
*G06F 9/38*    (2018.01)
(52) U.S. Cl.
CPC .......... *G06F 9/3804* (2013.01); *G06F 9/3806* (2013.01); *G06F 9/3844* (2013.01); *G06F 9/3848* (2013.01)
(58) Field of Classification Search
CPC ..... G06F 9/3844; G06F 9/3848; G06F 9/3806
See application file for complete search history.

(56) References Cited

U.S. PATENT DOCUMENTS 5,857,104 A * 1/1999 Natarjan ............... G06F 8/4451
712/239
7,114,063 B1 * 9/2006 Fontaine ............. G06F 9/30094
712/235
(Continued)

FOREIGN PATENT DOCUMENTS

JP    2011-141619 A    7/2011

OTHER PUBLICATIONS

T. H. Heil, Z. Smith and J. E. Smith, "Improving branch predictors by correlating on data values," MICRO-32. Proceedings of the 32nd Annual ACM/IEEE International Symposium on Microarchitecture, Haifa, Israel, pp. 28-37 (Year: 1999).*
(Continued)

*Primary Examiner* — Keith E Vicary
(74) *Attorney, Agent, or Firm* — McDermott Will & Emery LLP

(57) ABSTRACT

A processor device capable of raising a hit rate of branch destination prediction is provided. Every time a load instruction to a data cache is generated, an equivalent value judgment circuit judges accord/disaccord of present load data and previous load data from a corresponding line. In an N bit region, as history records, a judgment history record circuit records judgment results of N times by the equivalent value judgment circuit before a conditional branch instruction is generated. When the conditional branch instruction is generated, based on the history records in the N bit region, a branch prediction circuit predicts the same branch destination as the previous branch destination obtained by a previous execution result of the conditional branch instruction or a branch destination different from the previous destination. Further, the branch prediction circuit issues an instruction fetch direction of the predicted branch destination to a processor main-body circuit.

4 Claims, 25 Drawing Sheets

(56) References Cited

U.S. PATENT DOCUMENTS

| | | | | |
|---|---|---|---|---|
| 8,694,760 B2* | 4/2014 | Amano | ................ | G06F 9/3844 |
| | | | | 712/233 |
| 9,495,157 B1* | 11/2016 | Bradbury | ............ | G06F 9/30058 |
| 2002/0078331 A1* | 6/2002 | Ju | ........................... | G06F 9/383 |
| | | | | 712/240 |
| 2015/0363204 A1* | 12/2015 | Bonanno | ............... | G06F 9/3806 |
| | | | | 712/240 |

OTHER PUBLICATIONS

Sachdeva, Kapil. Load Values and the Branches That Use Them.; Thesis submitted in partial fulfillment of the requirements for the degree of Master of Science in Electrical Engineering in the Graduate College of the University of Illinois at Urbana-Champaign; 63 pages (Year: 2005).*

J. L. Aragon, J. Gonzalez, J. M. Garcia and A. Gonzalez, "Selective branch prediction reversal by correlating with data values and control flow," Proceedings 2001 IEEE International Conference on Computer Design: VLSI in Computers and Processors. ICCD 2001, Austin, TX, USA, pp. 228-233. (Year: 2001).*

J. Gonzalez and A. Gonzalez, "Control-flow speculation through value prediction for superscalar processors," 1999 International Conference on Parallel Architectures and Compilation Techniques (Cat. No. PR00425), Newport Beach, CA, USA, pp. 57-65. (Year: 1999).*

Computer Archtecture, Quantitative Approach, 5th Edition, written by Hennessy & Patterson, published by Shoeisha, Mar. 18, 2014, pp. 198 to 200.

* cited by examiner

FIG. 20

| t | PREDICTION/RESULT | INSTRUCTION | DT | EQUIVALENT VALUE JUDGMENT | HR | AMSK | OMSK | BRP | TDAMSK | TDOMSK | EDAMSK | EDOMSK |
|---|---|---|---|---|---|---|---|---|---|---|---|---|
| t1 | | load IO1 | T | T | (T,F,F) | | | | | | | |
| t2 | | load IO2 | T | T | (T,T,F) | | | | | | | |
| t3 | | load IO3 | F | T | (T,T,T) | | | | | | | |
| t4 | | XX=IO1 or IO2 | | | | | | | | | | |
| t5 | NO ENTRY | bnz (XX) AA | | | | | | | | | | |
| t6 | BRPr = "ESTABLISHED" | | | | | (1,1,1) | (0,0,0) | ESTABLISHED | (0,0,0) | (0,0,0) | (0,0,0) | (0,0,0) |
| t7 | | load IO1 | F | F | (F,T,T) | | | | | | | |
| t8 | | load IO2 | F | F | (F,F,T) | | | | | | | |
| t9 | | load IO3 | F | T | (T,F,F) | | | | | | | |
| t10 | | XX=IO1 or IO2 | | | | | | | | | | |
| t11 | PREDICTION = "UN-ESTABLISHED" | bnz (XX) AA | | | | (1,1,1) | (0,1,1) | UN-ESTABLISHED | (0,0,0) | (1,0,0) | (0,0,0) | (0,0,0) |
| t12 | BRPr = "UN-ESTABLISHED" | | | | | | | | | | | |
| t13 | | load IO1 | T | F | (F,T,F) | | | | | | | |
| t14 | | load IO2 | F | T | (T,F,T) | | | | | | | |
| t15 | | load IO3 | F | T | (T,T,F) | | | | | | | |
| t16 | | XX=IO1 or IO2 | | | | | | | | | | |
| t17 | PREDICTION = "UN-ESTABLISHED" | bnz (XX) AA | | | | (0,0,1) | (0,0,1) | ESTABLISHED | (0,0,0) | (1,0,0) | (0,0,0) | (1,1,0) |
| t18 | BRPr = "ESTABLISHED" | | | | | | | | | | | |
| t19 | | load IO1 | F | F | (F,T,T) | | | | | | | |
| t20 | | load IO2 | T | F | (F,F,T) | | | | | | | |
| t21 | | load IO3 | T | F | (F,F,F) | | | | | | | |
| t22 | | XX=IO1 or IO2 | | | | | | | | | | |
| t23 | PREDICTION = "UN-ESTABLISHED" | bnz (XX) AA | | | | (0,0,0) | (0,1,0) | ESTABLISHED | (1,1,1) | (1,0,0) | (0,0,0) | (1,1,0) |
| t24 | BRPr = "ESTABLISHED" | | | | | | | | | | | |
| t25 | | load IO1 | T | F | (F,F,F) | | | | | | | |
| t26 | | load IO2 | T | T | (T,F,F) | | | | | | | |
| t27 | | load IO3 | T | T | (T,T,F) | | | | | | | |
| t28 | | XX=IO1 or IO2 | | | | | | | | | | |
| t29 | PREDICTION = "ESTABLISHED" | bnz (XX) AA | | | | (0,0,0) | (0,1,1) | ESTABLISHED | (1,1,1) | (1,0,0) | (0,0,0) | (1,1,0) |
| t30 | BRPr = "ESTABLISHED" | | | | | | | | | | | |

BRANCH DESTINATION PREDICTION BASED ON ACCORD OR DISCORD OF PREVIOUS LOAD DATA FROM A DATA CACHE LINE CORRESPONDING TO A LOAD INSTRUCTION AND PRESENT LOAD DATA

CROSS-REFERENCE TO RELATED APPLICATIONS

The disclosure of Japanese Patent Application No. 2017-104652 filed on May 26, 2017 including the specification, drawings and abstract is incorporated herein by reference in its entirety.

BACKGROUND

The present invention relates to a processing device and, for example, relates to a processor device having a branch destination prediction function.

Japanese Unexamined Patent Publication No. 2011-141619 discloses a microprocessor unit compliant to a memory read instruction being a memory read instruction with flag setting that sets a flag when read data from a memory differs from cache data, a flag reset instruction that resets the flag, and a flag reference branch instruction that indicates presence and absence of a branch based on a value of the flag. In configuring a program that skips an execution of the processing according to a result of comparison between an input value before certain processing and an important value of present processing, using these instructions allows the comparison of the input values to be performed using the flags improving efficiency of the processing.

Moreover, "COMPUTER ARCHITECTURE, Quantitative Approach, 5th Edition", written by Hennessy & Patterson, published by Shoeisha, 2014 Mar. 18, pages 198 to 200, discloses a system which performs a branch destination prediction using a branch destination buffer having a plurality of entries. In each entry, there are registered an instruction address which serves as an address of a conditional branch instruction, a prediction Program Counter (PC) used as an instruction address predicted as a next PC of the conditional branch instruction, and a branch success/failure prediction used as information for predicting whether the conditional branch instruction is established or not. When the generated conditional branch instruction is present in the entry, the prediction PC is fetched in advance. Subsequently, when an actual branch result differs from the prediction, the fetched instruction is nullified while a correct instruction is fetched and the entry is also updated.

SUMMARY

A processor device having a branch destination prediction function is commonly known. The branch destination prediction is a technology that predicts, in advance, a branch destination address of a conditional branch instruction when the conditional branch instruction is generated, and that fetches, in advance, an instruction for the predicted branch destination (address). When the prediction hits with high precision, an instruction pipeline can be used efficiently. A system using a branch destination buffer as shown in "COMPUTER ARCHITECTURE, Quantitative Approach, 5th Edition", written by Hennessy & Patterson, published by Shoeisha, 2014 Mar. 18, pages 198 to 200, is known, for example, as a system for branch destination prediction. This system is, in short, a system predicting, when a conditional branch instruction is generated, the same branch result as a previous branch result (i.e., a branch destination address) of the conditional branch instruction.

For example, in matrix calculation performed in scientific calculation, loop processes are performed multiple times in many cases. Using the system such as the one shown in "COMPUTER ARCHITECTURE, Quantitative Approach, 5th Edition", written by Hennessy & Patterson, published by Shoeisha, 2014 Mar. 18, pages 198 to 200, increases the hit ratio of the branch destination prediction. However, for example, in machine control and the like using a finite automaton (state machine), there are many cases where whether or not loop processing is performed is defined according to external control signals. In such cases, multiple loop processes may not be always performed. Therefore, in the method like the one shown in "COMPUTER ARCHITECTURE, Quantitative Approach, 5th Edition", written by Hennessy & Patterson, published by Shoeisha, 2014 Mar. 18, pages 198 to 200, the hit rate of the branch destination prediction may decrease.

Embodiments to be described later are made in view of the above. Other objects and novel features of the disclosed technologies will become apparent from the description of the present specification and the accompanying drawings.

A processor device according to one embodiment includes a data cache, an equivalent value judgment circuit, a judgment history record circuit, a branch prediction circuit, and a processor main-body circuit in charge of fetching, decoding, and executing an instruction. Every time a load instruction to the data cache is generated, the equivalent value judgment circuit judges whether previous load data and present load data from a corresponding line accord/discord. The judgment history record circuit records, in an N bit region, judgment results of N times, respectively, by the equivalent value judgment circuit before a conditional branch instruction is generated. When conditional branch instruction is generated, the branch prediction circuit predicts, based on the history record in the N bit region, whether the same branch destination as a previous destination obtained by a previous execution result of the conditional branch instruction or a branch destination different from the previous branch destination. Further, the branch prediction circuit issues a fetch direction of an instruction of the prediction branch destination to the processor main-body circuit.

According to one embodiment described above, a hit rate of the branch destination prediction can be increased.

BRIEF DESCRIPTION OF THE DRAWINGS

FIG. 20 is a diagram showing one example of execution progress of a conditional branch program using a processor unit of FIG. 15;

DETAILED DESCRIPTION

Figure 1:
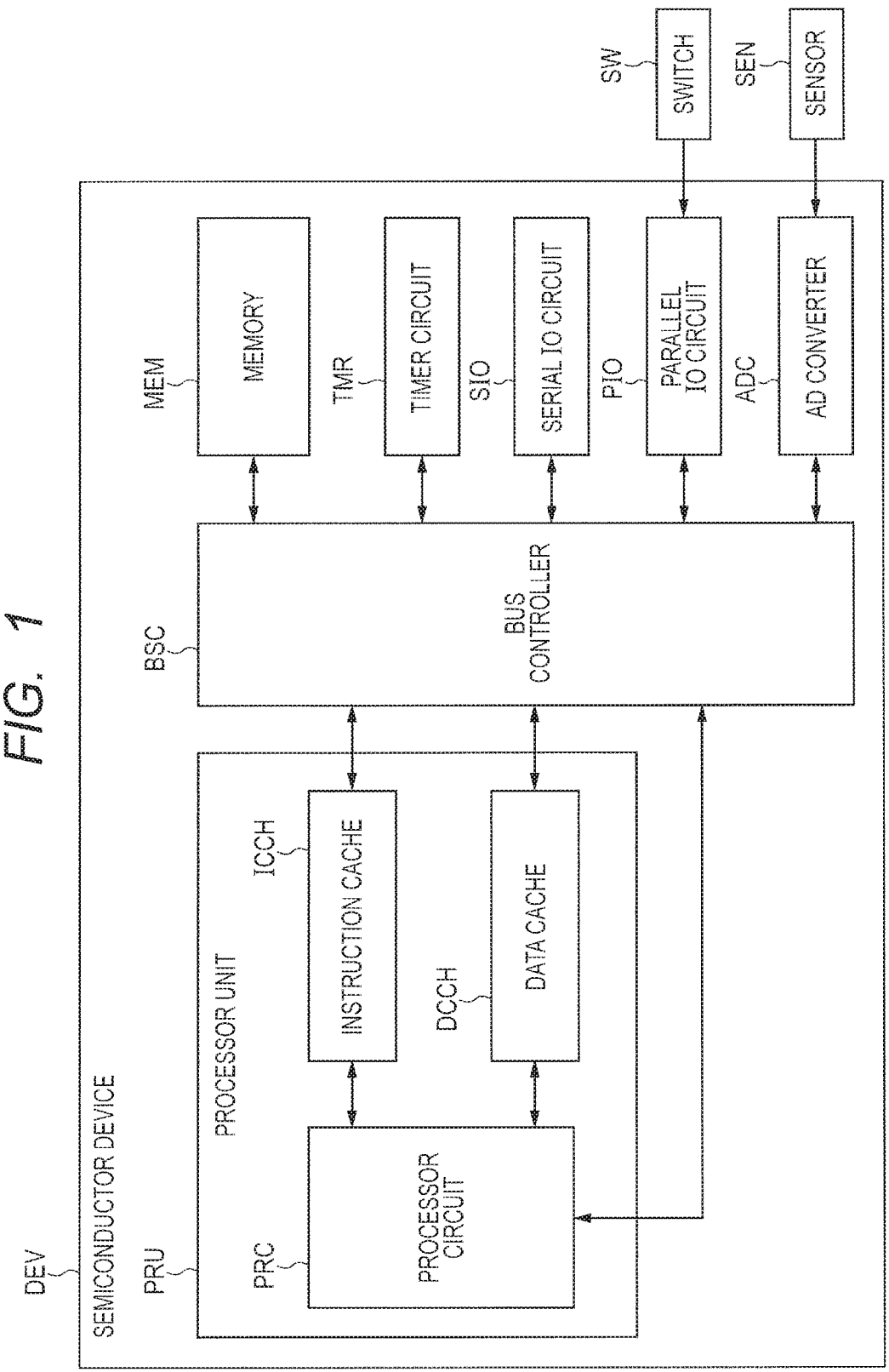
FIG. 1 is a schematic diagram showing an example configuration of a semiconductor device according to the present invention.

The invention will be described by being divided into a plurality of sections or embodiments whenever circumstances require it for convenience in the following embodiments. However, unless otherwise specified in particular, they are not irrelevant to one another. One thereof has to do with modifications, applications, details, supplementary explanations, and the like of some or all of the other. When reference is made to the number of elements or the like (including number of pieces, numerical values, quantity, range, etc.) in the following embodiments, the number thereof is not limited to a specific number and may be greater than or less than or equal to the specific number unless otherwise specified in particular and definitely limited to the specific number in principle.

Further, in the following embodiments, components (including element steps, etc.) are not always essential unless otherwise specified in particular and considered to be definitely essential in principle. Similarly, when reference is made to the shapes, positional relations, and the like of the components or the like in the following embodiments, they will include ones substantially approximate or similar to their shapes or the like unless otherwise specified in particular and considered not to be definitely so in principle, for example. This is similarly applied even to the above-described number or the like (including the number of pieces, numerical values, quantity, range, etc.).

Although circuit elements included in each functional block according to embodiments are not particularly limitative, circuit elements are formed over a semiconductor substrate, such as single crystal silicon, by a known integrated circuit technology, such as a CMOS (Complementary MOS transistor).

Hereinafter, embodiments of the present invention will be described with reference to the accompanying drawings. The same elements are denoted by the same reference numerals, and a repeated explanation is omitted.

First Embodiment

<Configuration of Semiconductor Device>

FIG. 1 is a schematic diagram showing an example configuration of a semiconductor device according to First Embodiment of the present invention. The semiconductor device DEV shown in FIG. 1 is a microcontroller and the like including a single semiconductor chip, for example. The semiconductor device DEV includes: a processor unit (processor device) PRU having a processor circuit PRC, an instruction cache ICCH, and a data cache DCCH; a memory MEM; various peripheral units; and a bus controller BSC. The bus controller BSC controls communication between the processor unit PRU and the various peripheral units and includes a bus as well as a mediating circuit and the like thereof. The various peripheral units include, for example, a timer circuit TMR, s serial IO (Input Output) circuit SIO, a parallel IO circuit PIO, an AD (Analog to Digital) converter ADC and the like.

The instruction cache ICCH and the data cache DCCH include high-speed memories, such as an SRAM (Static Random Access Memory) and the like. The memory MEM is a volatile memory, such as a DRAM (Dynamic Random Access Memory) and the like or a nonvolatile memory such as a flash memory and the like. Also, the memory MEM mainly holds a program (an instruction) to be executed by the processor circuit PRC and various data and the like accompanying there to. The processor circuit PRC executes a predetermined program while taking, into the instruction cache ICCT and the data cache DCCH as required, a program and the various data on the memory MEM.

The timer circuit TMR measures predetermined time based on instructions from a program and the like. The serial IO circuit SIO is in charge of control when sending and receiving serial data to and from the outside of the device. The parallel IO circuit PIO is in charge of control when sending and receiving parallel data to and from the outside of the device. The AD converter ADC converts analog data inputted from the outside to digital data. Further, the memory MEM may be provided outside the device. In some cases, the instruction cache ICCH and the data cache DCCH may be provided outside the device.

The semiconductor device DEV described above is often used in machine control by, for example, a finite automaton (a state machine). In the example of FIG. 1, the parallel IO circuit PIO is coupled to a switch SW provided externally, and the AD converter ADC is coupled to a sensor SEN provided externally. For example, the parallel IO circuit PIO stores an ON/OFF state of the switch SW in memory-mapped IO and the like, and the AD converter ADC stores digital data based on a detection result of the sensor SEN in the memory-mapped IO and the like.

As widely known, the memory-mapped IO is a system where both an address space of the memory MEM and address spaces of various peripheral units coexist in a memory address space as seen from the processor unit PRU. The processor unit PRU executes processing of the state machine according to a program. Specifically, for example, the processor unit PRU performs a program that shifts a state of the state machine corresponding to data of the above memory mapped IO. When the data is not changed, the processor unit PRU maintains a certain state and executes loop processing.

Outline of Principal Part of Processor Unit (Comparative Example)

Figure 21:
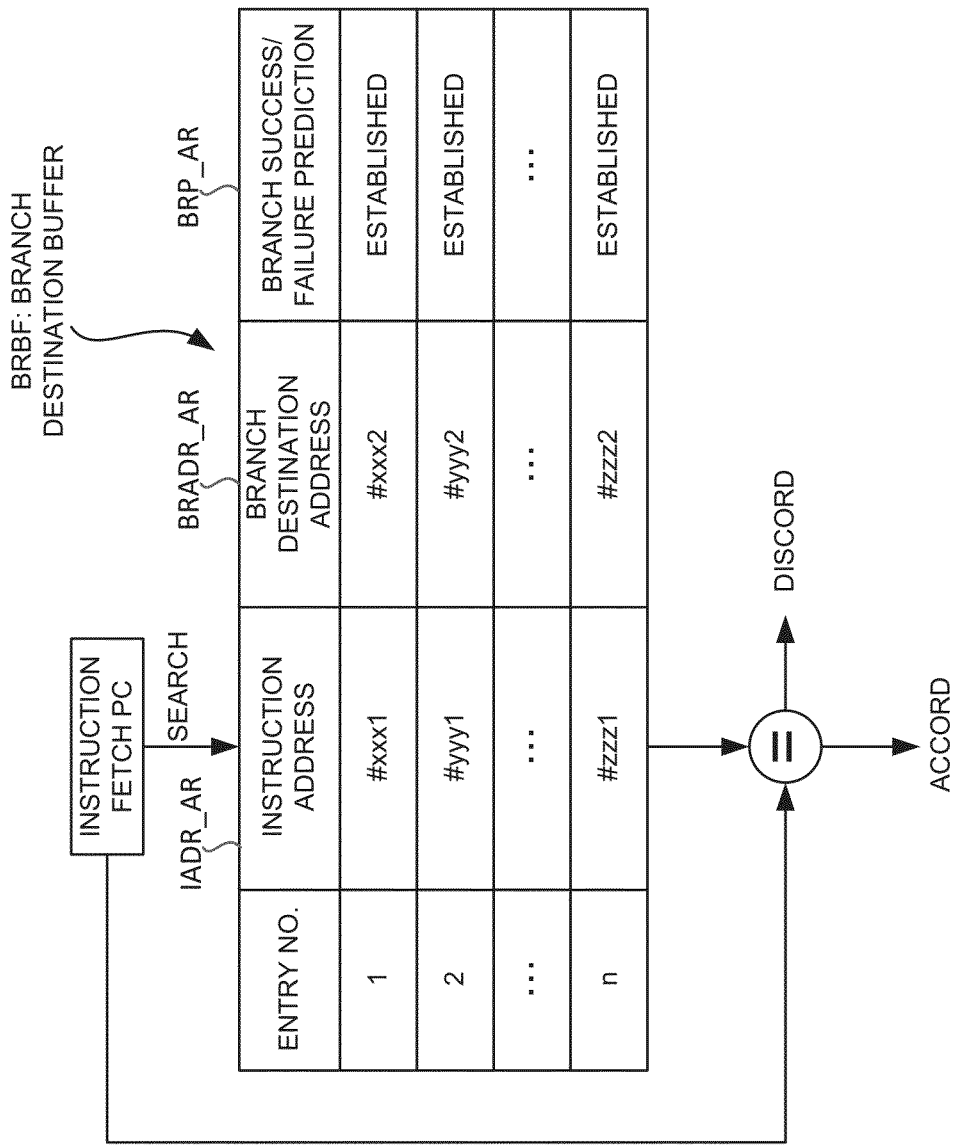
FIG. 21 is a schematic diagram showing a configuration example of a principal part of a processor unit to be a comparative example of the present invention.

First, prior to explanations of the processor unit of the embodiment, a processor unit of a comparative example will be explained. FIG. 21 is a schematic diagram showing an example configuration of a principal part of a processor unit to be a comparative example of the present invention. The processor unit may include a branch destination prediction function. FIG. 21 shows a typical schematic configuration for achieving the branch destination prediction function. According to the example shown in FIG. 21, the branch destination prediction function is achieved by providing a branch destination buffer BRBF. The branch destination buffer BRBF includes a plurality of entries (n entries, in this example). Each entry includes an instruction address region IADR_AR, a branch destination addressing region BRADR_AR, and a branch success/failure prediction region BRP_AR.

An instruction address IADR of a conditional branch instruction is registered in the instruction address region IADR_AR. An instruction address to be predicted as a branch destination of the conditional branch instruction (in the specification, called a "branch destination address (prediction) BRADRp") is registered in the branch destination address region BRADR_AR. Information on whether to predict the conditional branch instruction as branch established or to predict as branch not established (in the specification, called "branch success/failure prediction BRP) is registered in the branch success/failure prediction region BRP_AR.

Figure 22:
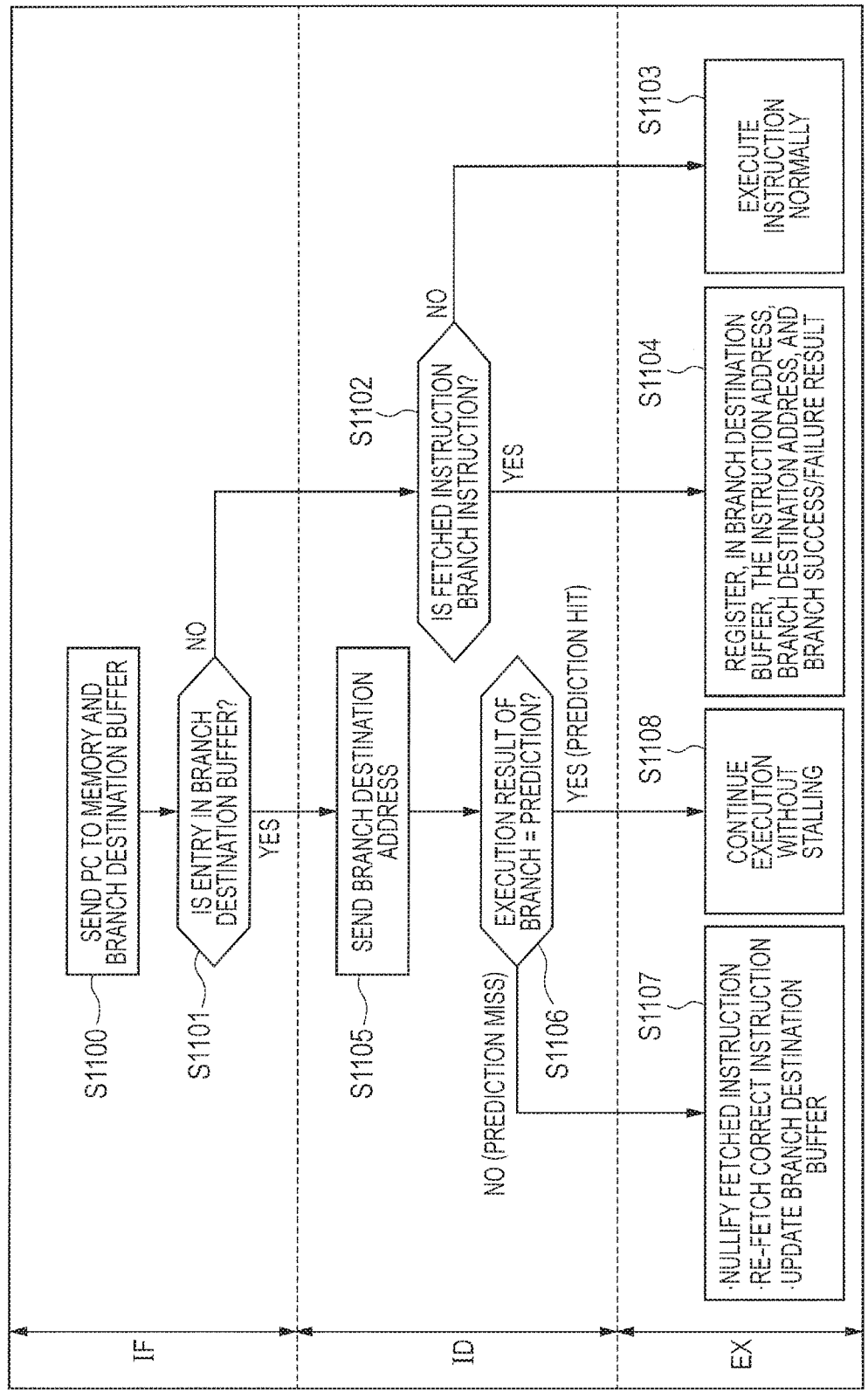
FIG. 22 is a flowchart showing an operation example of a processor unit of FIG. 21.

FIG. 22 is a flowchart showing an example operation of the processor unit of FIG. 21. In FIG. 22, first, the processor unit sends an instruction fetch PC (Program Counter) to a memory (that is, an instruction to be stored in the instruction fetch PC is fetched), and also sends the instructions fetch PC to the branch destination buffer BRBF (step S1100). The branch destination buffer BRBF searches the instruction address region IADR_AR to check whether or not there is an entry where the same value (namely, the same instruction address IADR) as the sent PC is registered (step S1101).

When there is no entry, the processor unit judges whether or not the fetched instruction is a conditional branch instruction (step S1102). When the fetched instruction is not the conditional branch instruction, the processor unit executes the instruction normally (step S1103). On the other hand, when the instruction is the conditional branch instruction, the processor unit registers the instruction address IADR of the conditional branch instruction in the branch destination buffer BRBF. In addition, the processor unit registers, as a branch destination address (prediction) BRADRp and a branch success/failure prediction BRP, a branch destination instruction address (in the specification, called a "branch destination address (result) BRADRr) and a branch success/failure result obtained by an execution result of the conditional branch instruction, respectively (step S1104).

On the other hand, when it is determined that there is an entry in the branch destination buffer BRBF in step S1101, the branch destination buffer BRBF sends a branch destination address (prediction) BRADRp as a predicted branch destination to be registered in the entry (step S1105). In view of the above, the processor unit fetches, in advance, an instruction of the branch destination address (prediction) BRADRp (step S1105). Subsequently, the processor unit judges whether or not a branch destination address (result) BRADRr obtained from the execution result of the conditional branch instruction is in accord with the branch destination address (prediction) BRADRp of step S1105 (step S1106).

When the branch destination address (result) BRADRr and the branch destination address (prediction) BRADRp are in accord, it is considered as a prediction hit. Therefore, the processor unit executes the instruction fetched in advance in step S1105 without stalling (step S1108). On the other hand, when the branch destination address (result) BRADRr and the branch destination address (prediction) BRADRp are in discord, it is considered as a prediction miss. Therefore, the processor unit nullifies the instruction fetched in advance in step S1105 and re-fetches a correct instruction stored in the branch destination address (result) BRADRr (step S1107). Moreover, in step S1107, the processor unit updates a branch destination address (prediction) BRADRp and a branch success/failure prediction BRP in the corresponding entries using the branch destination address (result) BRADRr and the branch success/failure result, respectively.

When a prediction miss occurs in step S1106, a stall of a pipeline corresponding to the re-fetch occurs in a processor unit that processes IF (Instruction Fetch), an ID (Instruction Decode), and an EX (Execution) using the pipeline. Therefore, several clocks (for example, two clocks for the IF and the ID) will be required before a next instruction is executed. Thus, when the prediction miss occurs with high frequency, performance speed (MIPS: Million Instructions Per Second) of the processor unit decreases according to the stall of the pipeline. Therefore, an improvement in hit rate of the branch destination prediction is desired.

Problems of Processor Unit (Comparative Example)

Figure 23:
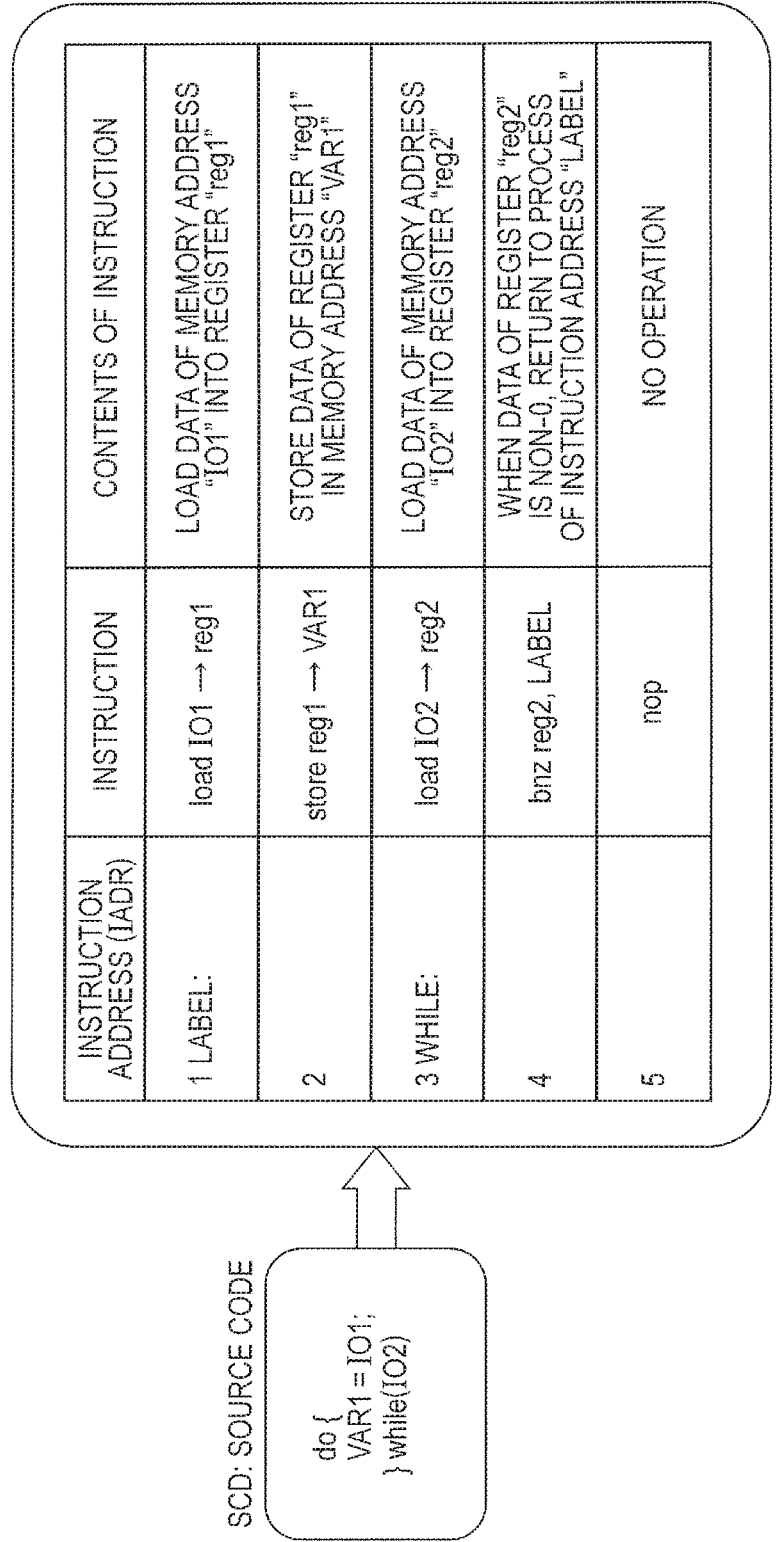
FIG. 23 is a diagram showing examples of a source code executed by a processor unit and an instruction code corresponding thereto.

FIG. 23 shows one example of a source code, which is to be executed by the processor unit, and a corresponding instruction code. The source code SCD shown in FIG. 23 continues acquiring data of a memory address "IO1" until data of a memory address "IO2" becomes 0. The source code SCD is converted to an instruction code ICD of FIG. 23 by a compiler, and, then, stored in the memory MEM of FIG. 1.

For example, the memory address "IO2" corresponds to a memory mapped IO holding an ON/OFF state of the switch SW described in FIG. 1. The memory address "IO1" corresponds to a memory mapped IO holding detection results of the sensor SEN described in FIG. 1. In this case, based on the instruction code ICD of FIG. 23, the processor unit executes processing so as to sequentially take in detection results of the sensor SEN using a loop process during an ON period of the switch SW. Alternatively, when the switch SW is in an OFF state, the processor unit executes processing without using the loop process.

For example, on the assumption that the switch SW shifted from OFF state to the ON state and the ON period is kept sufficiently long, suppose that the processor unit executes the instruction code ICD of FIG. 23 using the branch destination prediction function shown in FIGS. 21 and 22. In this case, according to a first loop process, the processor unit registers, in the branch destination buffer BRBF, an instruction address IADR "4" being a conditional branch instruction in the instruction code ICD of FIG. 23, a branch destination address (result) BRADRp (in this case "1") obtained by the execution result, and a branch established/un-established result (in this case, "established") are registered (step S1104).

Subsequently, when executing a conditional branch instruction of the instruction address IADR "4" in a second loop process, the processor unit fetches, based on the branch destination buffer BRBF, an instruction of the branch destination address (prediction) BRADRp "1" in advance (step S1105). When the ON period of the switch SW is sufficiently long, the branch destination address (result) BRADRr obtained by the execution result of the conditional branch instruction is in accord with the branch destination address (prediction) BRADRp "1". For this reason, the processor unit executes, using the instruction fetched in advance, a third loop process without stalling the pipeline (steps S1106 and S1108). Similarly, hereinafter, the processor unit can repeatedly execute the loop process without stalling the pipeline.

Thus, the branch destination prediction function of FIGS. 21 and 22 is a system which predicts the same execution result as the previous execution result (i.e., the branch destination address (result) BRADRr) of the conditional branch instruction when a conditional branch instruction is generated. Therefore, when multiple numbers of loop processes are executed, it is possible to raise the hit rate of the branch destination prediction. However, for example, when the semiconductor device DEV of FIG. 1 is adopted in a machine-controlled system and the like, depending on an intended use, the ON/OFF state of the switch SW may be changed frequently in a short period of time.

In such a case, for example, a prediction miss may occur in the second loop process and the like described above (that is, the branch destination address (result) BRADRr is "5"). Therefore, pipeline processing is stalled according to a re-fetch of the instruction of the branch destination address (result) BRADRr "5". For example, when the processor unit regularly executes the instruction code ICD of FIG. 23, the stall occurs more frequently which may lower performance speed of the processor unit.

Outline of Principal Part of Processor Unit (First Embodiment)

Figure 2:
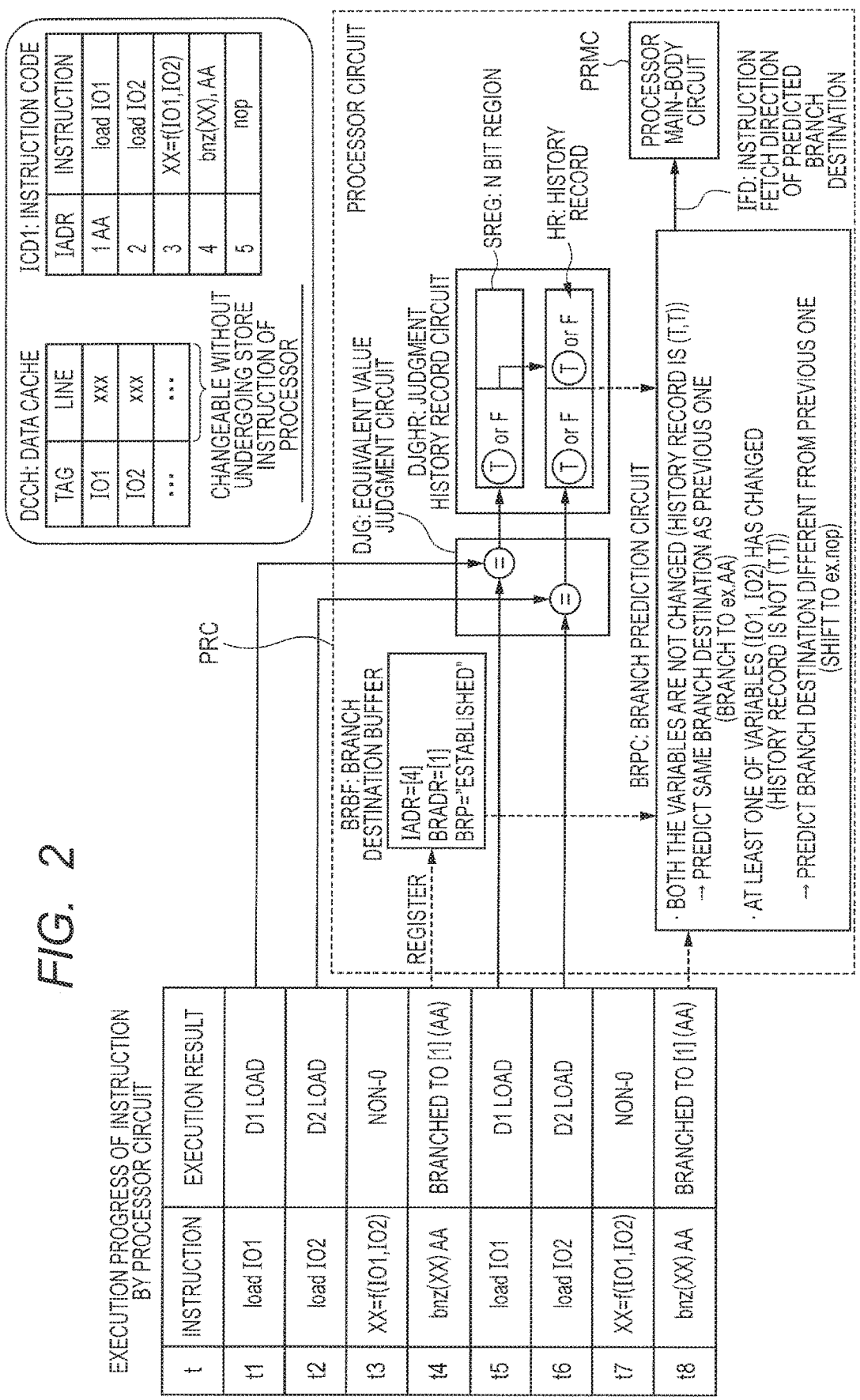
FIG. 2 is a diagram showing a brief example configuration and an operation example of a principal part of a processor unit in FIG. 1.

FIG. 2 is a diagram showing a brief configuration example and an operation example of a principal part of a processor unit in FIG. 1. In addition to the configuration of the processor circuit PRC in the processor unit PRU of FIG. 1 and a data cache DCCH, FIG. 2 schematically shows an instruction code ICD1 executed by the processor circuit PRC and execution progress of the instruction code ICD1.

The data cache DCCH includes a plurality of entries, and each entry has a tag region and a line region. A memory address is registered in the tag region and data of the memory address is registered in the line region. For example, in the data cache DCCH of FIG. 2, memory addresses "101" and "IO2" based on memory mapped IO are registered in the tag region. In this case, data of line regions corresponding to "101" and "IO2" respectively can be practically changed without undergoing the store instruction of the processor circuit PRC. In other words, the data can be changed without involving the processor circuit PRC.

Specifically, for example, when having written data to a memory address based on the memory mapped IO, the parallel IO circuit PIO of FIG. 1 issues an invalid request of the memory address to the data cache DCCH via the bus controller BSC. In receiving the invalid request, when a memory address corresponding to the invalid request is registered in the tag region, the data cache DCCH sets a corresponding line region to be in an invalid state. When the processor circuit PRC issues a load instruction to the line region in the invalid state, the line region is rewritten using the latest data loaded from the memory MEM to be in a valid state. Thus, data in each of the line regions of "IO1" and "IO2" is changed without undergoing the store instruction of the processor circuit PRC.

According to the instruction code ICD1, in the loop process, the following processing contents are defined. That is, after data of the memory addresses "IO1" and "IO2" are loaded sequentially, a function "XX" with the load data of the "IO1" and "IO2" being parameters is calculated, and the loop process is repeated while the calculation result is not zero. Specifically, for example, as shown in FIG. 23, the instruction code ICD1 also includes accessing a register and the like, but the explanations will be omitted in order to make the explanation intelligible.

The processor circuit PRC includes an equivalent value judgment circuit DJG, a judgment history record circuit DJGHR, a branch prediction circuit BRPC, a processor main-body circuit PRMC, and a branch destination buffer BRBF. Every time a load instruction to the data cache DCCH is generated, the equivalent value judgment circuit DJG judges accord/discord of the previous load data from a line region corresponding to the load instruction and the present load data. The judgment history record circuit DJGHR is provided with a history bit region (N bit region) SREG including, for example, a shift register of N bit (in this example, N=2). The judgment history record circuit DJGHR records, in the history bit region SREG, judgment results of N times from the equivalent value judgment circuit DJG before the conditional branch instruction is generated as history records HR, respectively.

In the example of FIG. 2, the equivalent judgment circuit DJG judges accord/discord of the previous load data (in this case, "D1") corresponding to the load instruction of the instruction address IADR "1" at time t1 and the present load data (in this case, "D1") corresponding to the loading instruction of, similarly, the instruction address IADR "1" at time t5. Moreover, the equivalent value judgment circuit DJG judges accord/discord of the previous load data (in this case, "D2") corresponding to the load instruction of the instruction address IADR "2" at time t2 and the present load data (in this case, "D2") corresponding to the load instruction of, similarly, the instruction address IADR "2" at time t6. In this regard, in the present specification, the referent (for example, "IO1", "IO2") of the load data is called variables, and load data is called a variable value.

The judgment history record circuit DJGHR records, in a 2-bit history bit region SREG, two judgment results from the equivalent value judgment circuit DJG as history records HR, respectively. In the example of FIG. 2, the 2-bit history records HR in the history bit region SREG all indicate 'T' (in accord with the previous one). In addition, it is possible to decide, as required, the number of bits of the history bit region SREG (that is, the equivalent value judgment results as to how many times of load instructions are recorded before the generation of the conditional branch instruction). As the case may be, the number of bits can be decided such that it is variably controlled by setting.

When a conditional branch instruction is generated, the branch prediction circuit BRPC predicts, based on the history records HR in the history bit region SREG, the same branch destination as the previous destination obtained by the previous execution result of the conditional branch instruction or the branch destination different from the previous branch destination, and issues an instruction fetch direction IFD of the prediction branch destination. Specifically, when history records in the history bit region SREG all indicate 'T' (in accord with the previous one), the branch prediction circuit BRPC predicts the same branch destination as the previous destination. Alternatively, when any one of the history records HR indicates 'F' (in discord with the previous one), the branch prediction circuit BRPC predicts a branch destination different from the previous destination.

In the example of FIG. 2, when a conditional branch instruction of an instruction address IADR "4" is generated at time t8, the branch prediction circuit BRPC refers to the history bit region SREG. The history records HR based on the history bit region SREG all indicate accord twice (i.e., (T, T). Therefore, the branch prediction circuit BRPC predicts the same branch destination as the branch destination (i.e., an instruction address IADR "1" of the branch destination at time t4) obtained by the previous execution result of the conditional branch instruction of the instruction address IADR "4". Then, the branch prediction circuit BRPC issues an instruction fetch direction IFD of the predicted branch destination to the processor main-body circuit PRMC.

As widely known, the processor main-body circuit PRMC is a circuit which fetches, decodes, and executes an instruction, and is also a circuit that fetches, decodes, and executes the instruction by pipeline processing. As one of the operations, when executing a conditional branch instruction, the processor main-body circuit PRMC fetches an instruction of a predicted branch destination (here, an instruction of the instruction address IADR "1") in advance in response to the fetch direction IFD from the branch prediction circuit BRPC. In this regard, if the branch destination obtained by the present execution result of the conditional branch instruction differs from a predicted branch destination, the processor main-body circuit PRMC nullifies the instruction fetched in advance and re-fetches a correct instruction (for example, an instruction of an instruction address IADR "5").

As in the case of FIG. 21, a mutual relationship of the instruction address IADR and information on the previous branch destination based on the execution result of the conditional branch instruction by the processor main-body circuit PRMC is registered in the branch destination buffer BRBF. In this example, a mutual relationship of the instruction address IADR "4", a branch destination address BRADR "1", and branch success/failure prediction BRP "established" based on the execution result of the conditional branch instruction at time t4 is registered in the branch destination buffer BRBF.

In connection with the conditional branch instruction at time t8, when predicting the same branch destination as the previous destination, the branch prediction circuit BRPC obtains information on the branch destination from the branch destination buffer BRBF. Then, using the obtained branch destination address BRADR as a branch destination address (prediction) BRADRp, the branch prediction circuit BRPC issues a fetch direction IFD thereof. On the other hand, if a branch destination different from the previous destination is to be predicted, the branch prediction circuit BRPC defines a branch destination address (prediction) BRADRp separately.

Specifically, when a branch prediction address BRADR "1" and branch success/failure prediction BRP "established" are registered in the branch destination buffer BRBF and when predicting a branch destination different from the previous destination, the branch prediction circuit BRPC predicts branch success/failure (prediction) as "un-established" and defines a corresponding branch destination address (prediction) BRADRp (here, "5"). Alternatively, when a branch destination address BRADR "5" and branch success/failure prediction BRP "un-established" are registered in the branch destination buffer BRBF and when predicting a branch destination different from the previous destination, the branch prediction circuit BRPC predicts branch success/failure as "established" and defines a corresponding branch destination address (prediction) BRADRp (here "1").

Moreover, in FIG. 2, though not shown, similarly in the loop processing performed after time t8 also, the equivalent judgment circuit DJG judges accord/discord of each variable value according to the load instruction in the loop processing and each variable value at time t5 and time t6. Moreover, at time t8, if the execution result at time t8 differs from the execution result at time t4, the branch destination address BRADR of the branch destination buffer BRBF and branch success/failure prediction BRP are updated based on the execution result (branch destination address (result) BRADRr) at time t8.

As described above, when a conditional branch instruction is generated, the processor unit PRU of FIG. 2 predicts the same branch destination as the branch destination of the previous conditional branch instruction when a variable value corresponding to the load instruction reaching there and a variable value reaching the previous conditional branch instruction are the same. Also, when the variable value corresponding to the load instruction reaching there and a variable value reaching the previous conditional branch instruction are different, the processor unit PRU predicts the branch destination different from that of the previous conditional branch instruction. Moreover, as described in FIG. 23, particularly in a system of machine control and the like, many processes for changing the branch destinations according to the frequently switched variable values from the memory address.

In such a case, with use of the system of FIG. 2, the prediction branch destination can be changed according to a difference in variable value from the memory address. Therefore, as shown in FIGS. 21 and 22, as compared with the system in which the same branch destination as the previous one is simply predicted as shown in FIGS. 21 and 22, it becomes possible to raise the hit rate of the branch destination prediction. For example, in FIG. 2, when the variable value at time t6 differs from the variable value at time t2, a branch destination address "5" different from the one at time t4 can be set as a branch destination address (prediction) BRADRp in advance at time t8. Then, when the result of an operation at time t7 becomes zero according to the change in the value at time t6, the branch destination address (result) BRADRr obtained by the execution result of the conditional branch instruction of time t8 also becomes "5", and the branch destination prediction becomes a hit.

In this regard, in fact, it is conceivable that variables for defining the branch destination are not all the variables reaching a conditional branch instruction, but are a part of the variables. For example, in the case of the instruction code ICD as shown in FIG. 23, the variable for defining a branch destination is "IO2", and "IO1" is unrelated. The system of FIG. 2 determines accord/discord including the unrelated variables, and predicts a branch destination based on a judgment result thereof, which may increase prediction misses. For example, in FIG. 2, if the branch destination is determined by "IO2" alone and the variable value of "IO1" is changed frequently at time t8, a branch destination different from the previous one is predicted. However, an actual branch destination can be the same as the previous branch destination.

Figure 3A:
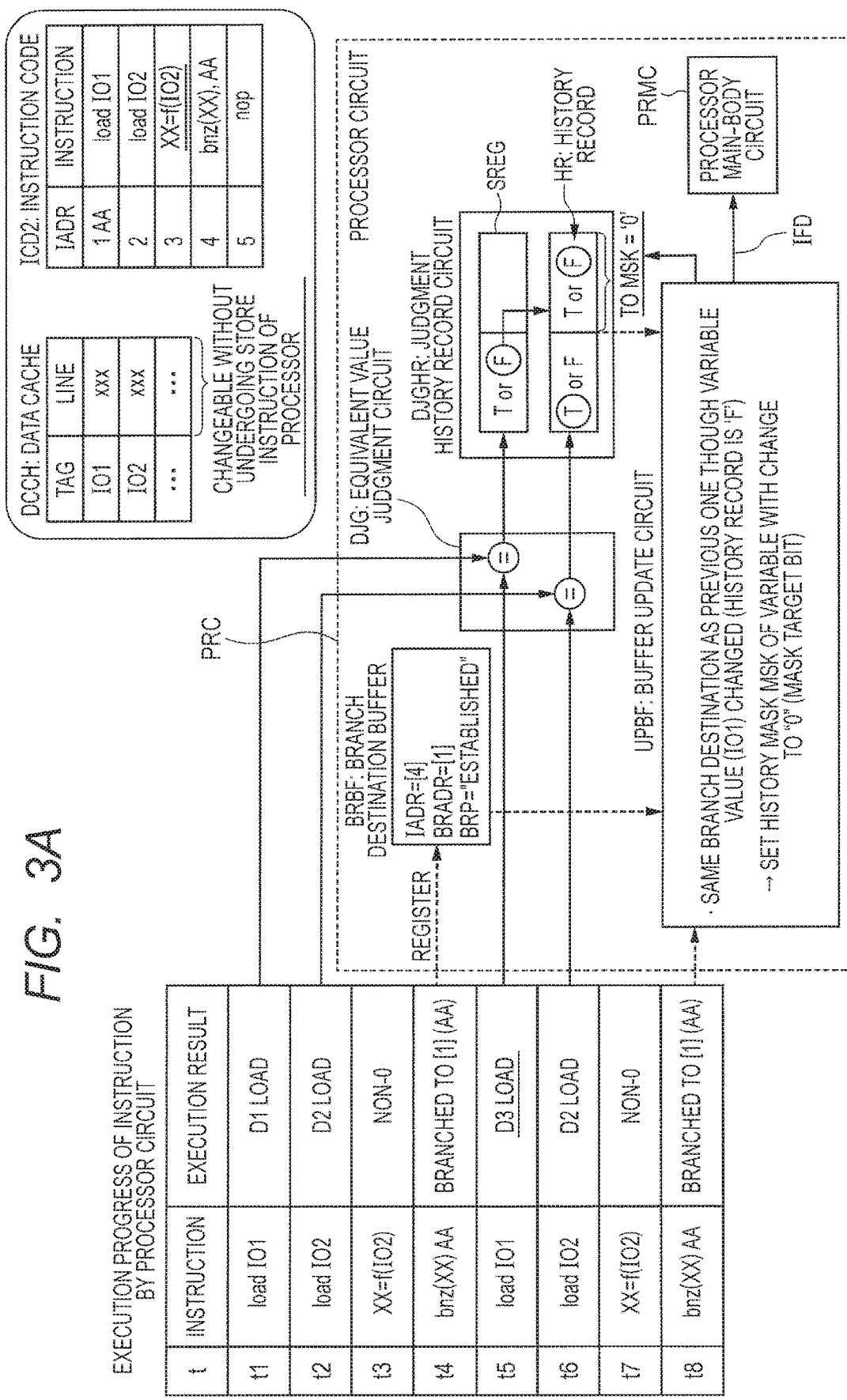
FIG. 3A is a diagram showing a brief example configuration and an example operation of a principal part of a processor unit where a history mask function is added to the processor unit of FIG. 2.
Figure 3B:
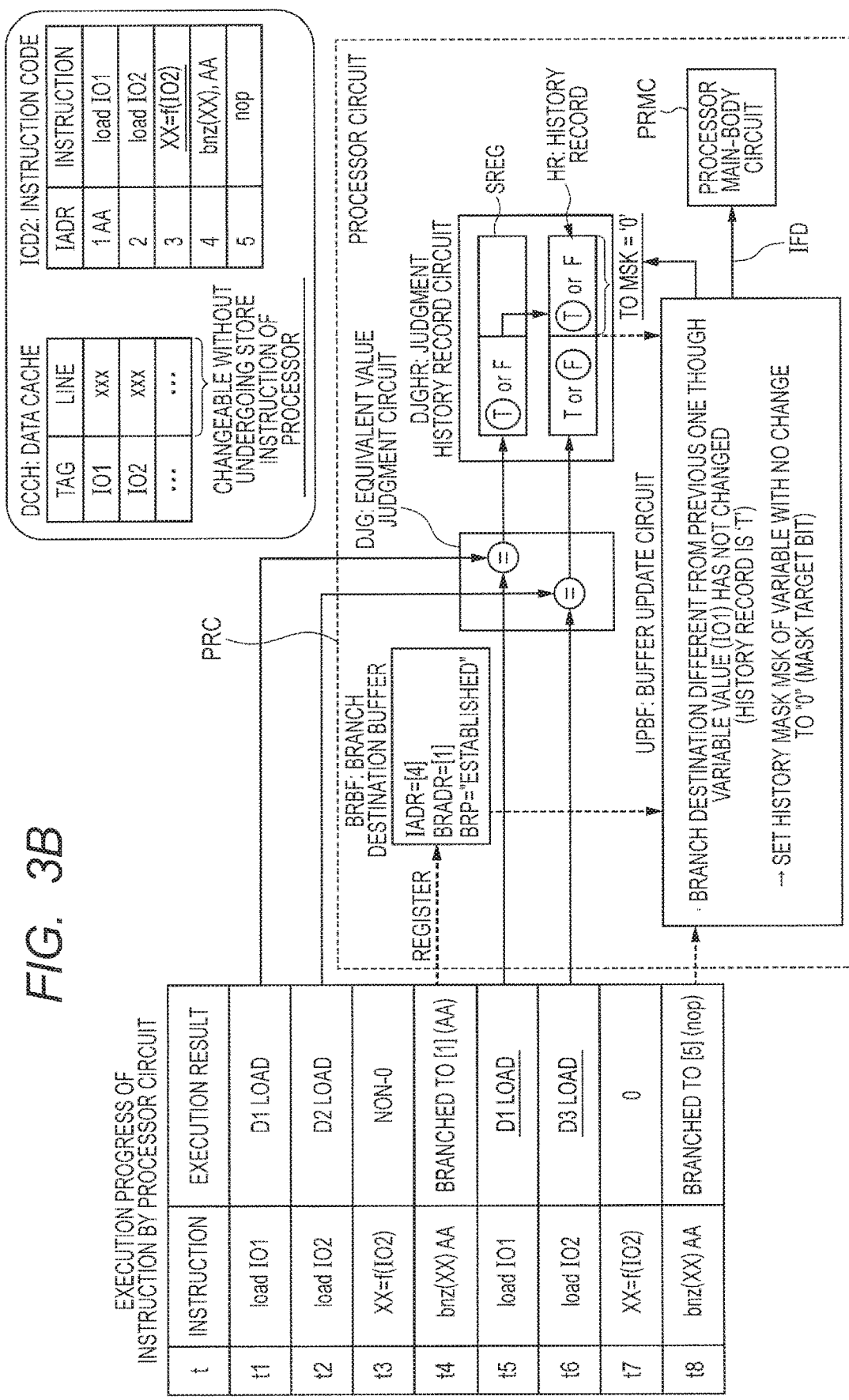
FIG. 3B is a diagram showing a brief example configuration and an example operation of a principal part of a processor unit where a history mask function is added to the processor unit of FIG. 2.
Figure 3C:
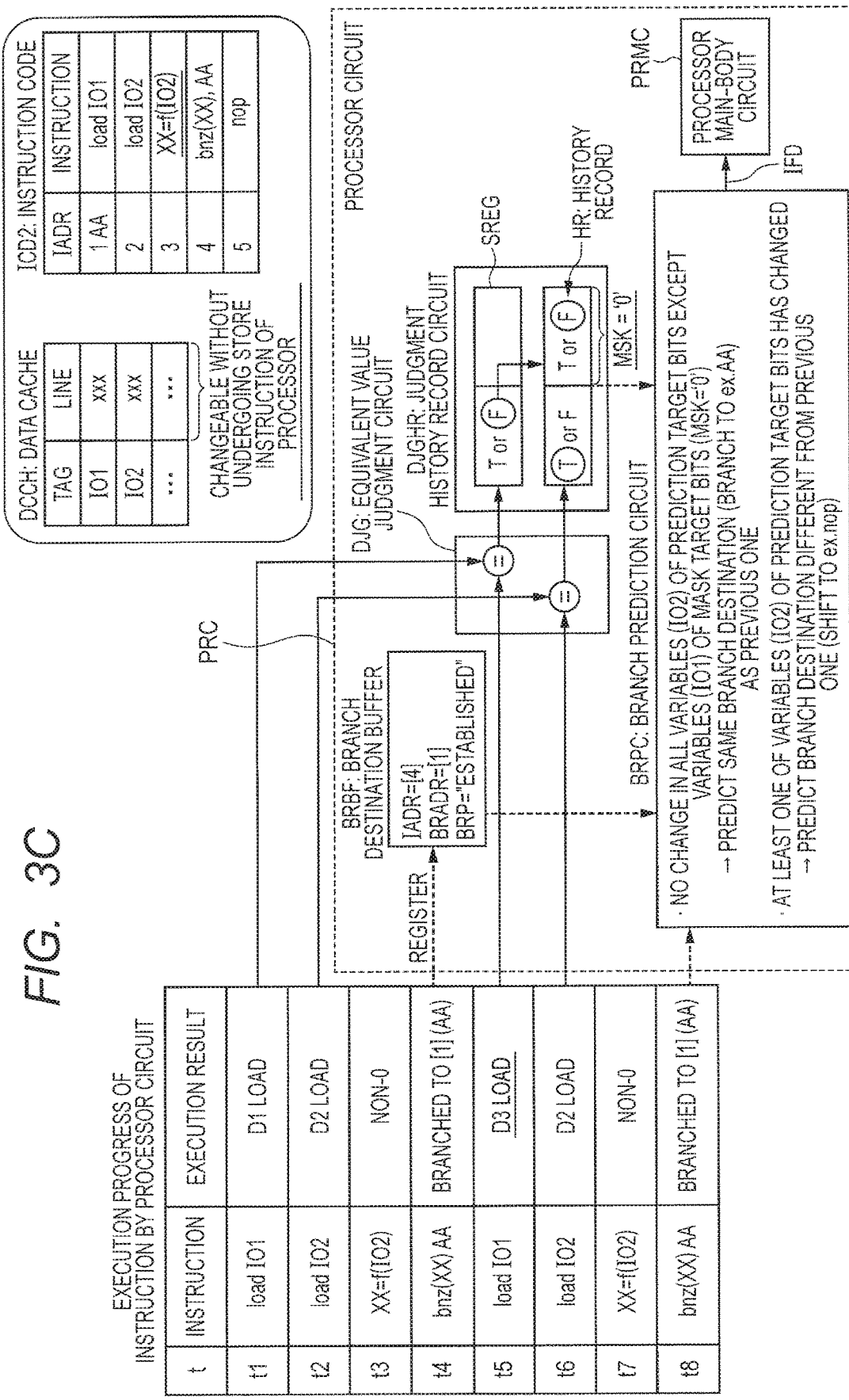
FIG. 3C is a diagram showing a brief example configuration and an example operation of a principal part of a processor unit where a history mask function is added to the processor unit of FIG. 2.

In order to avoid such a situation, it is beneficial to use a processor unit as shown in FIGS. 3A, 3B, and 3C. FIGS. 3A, 3B, and 3C are diagrams showing brief configuration examples and operation examples of a principal part of a processor unit where a history mask function is added to the one in FIG. 2. Unlike the case of FIG. 2, in FIGS. 3A and 3B, a buffer update circuit UPBF, which updates the history mask MSK, is provided. In FIG. 3C, the branch prediction circuit BRPC predicts a branch destination by reflecting the history mask MSK in the history bit region SREG.

In FIGS. 3A, 3B, and 3C, the processor circuit PRC executes an instruction code ICD different from the one in FIG. 2. Unlike the instruction code ICD1 in FIG. 2, an instruction code ICD2 uses only load data of a memory address "102" for calculation of a function "XX" in an instruction address IADR "3." In the example of FIG. 3A, in an execution process of an instruction by the processor circuit PRC, variable values of "101" differ at time t1 and at time t5. However, in the present branch destination at time t8, there is no change in the variable value of "102", and the branch destination is the same as the previous branch destination at time t4.

In this way, when the present branch destination is the same as the last branch destination, the buffer update circuit UPBF regards a bit whose history record HR indicates 'F' (in discord with the previous case) in the history bit region SREG as a bit (variable) unrelated to the branch, and defines it as a mask target bit. Specifically, in a history mask MSK having the same number of bits as that of the history bit region SREG, the buffer update circuit UPBF sets a bit with which the history record HR shows 'F' to '0' (not related to branch) which means the mask target bit. In the example of FIG. 3A, even though the history record HR of "101" is 'F' (in other words, the variable value is changed), the branch destination becomes the same as that of the previous time. Therefore, the "101" is defined as the mask target bit.

As a result, as shown in FIG. 3C, the branch prediction circuit BRPC performs branch destination prediction considering bits from which mask target bits are excluded in the history bit region SREG (i.e., bits whose history mask MSK is '1' (related to branch)) as prediction target bits. Specifically, when history records HR of the prediction target bits all indicates 'T' (in accord with the previous case), the branch prediction circuit BRPC predicts the same branch destination as the previous one. Also, when any one of the history records HR of the prediction target bits indicates 'F' (in discord with the previous case), the branch prediction circuit BRPC predicts a branch destination different from the previous branch destination. In the example of FIG. 3C, with respect to "IO2" being prediction target bits, as long as there is no change in the variable value of the "IO2", the same branch destination as the last time is predicted. As a result, henceforth, the branch destination prediction will be hit, thereby it becomes possible to raise the hit rate of the branch destination prediction.

Moreover, according to an example of FIG. 3B, in an instruction execution process by the processor circuit PRC, the variable value of "IO1" does not change at time t1 and time t5. However, since the variable value of "IO2" has changed at time t6, the present branch destination at time t8 differs from the last branch destination at time t4. Thus, when the previous branch destination differs from the present branch destination, the buffer update circuit UPBF regards a bit whose history record HR indicates 'T' (in accord with the previous case) in the history bit region SREG as a bit (variables) unrelated to the branch and defines the bit whose history record HR indicates 'T' in the history bit region SREG as a mask target bit.

In the example of FIG. 3B, although the history record HR of "101" is 'T' (in other words, the variable value has not changed), the branch destination has become different from the last time. Therefore, the "101" is defined as a mask target bit (a bit of history mask MSK='0'). As a result, though not shown, as in the case of FIG. 3C, branch prediction is performed next time with respect to "102" being a prediction target bit. As a result, henceforth, the branch destination prediction will be hit, thereby it becomes possible to improve the hit rate of the branch destination prediction. In addition, though not shown, the buffer update circuit UPBF registers the information on the history mask MSK (i.e., the mask target bit and the prediction target bit) in the branch destination buffer BRBF. When performing the branch destination prediction, the branch prediction circuit BRPC refers to the history bit region SREG and the history mask MSK of the branch destination buffer BRBF.

Configuration of Processor Unit (First Embodiment)

Figure 4:
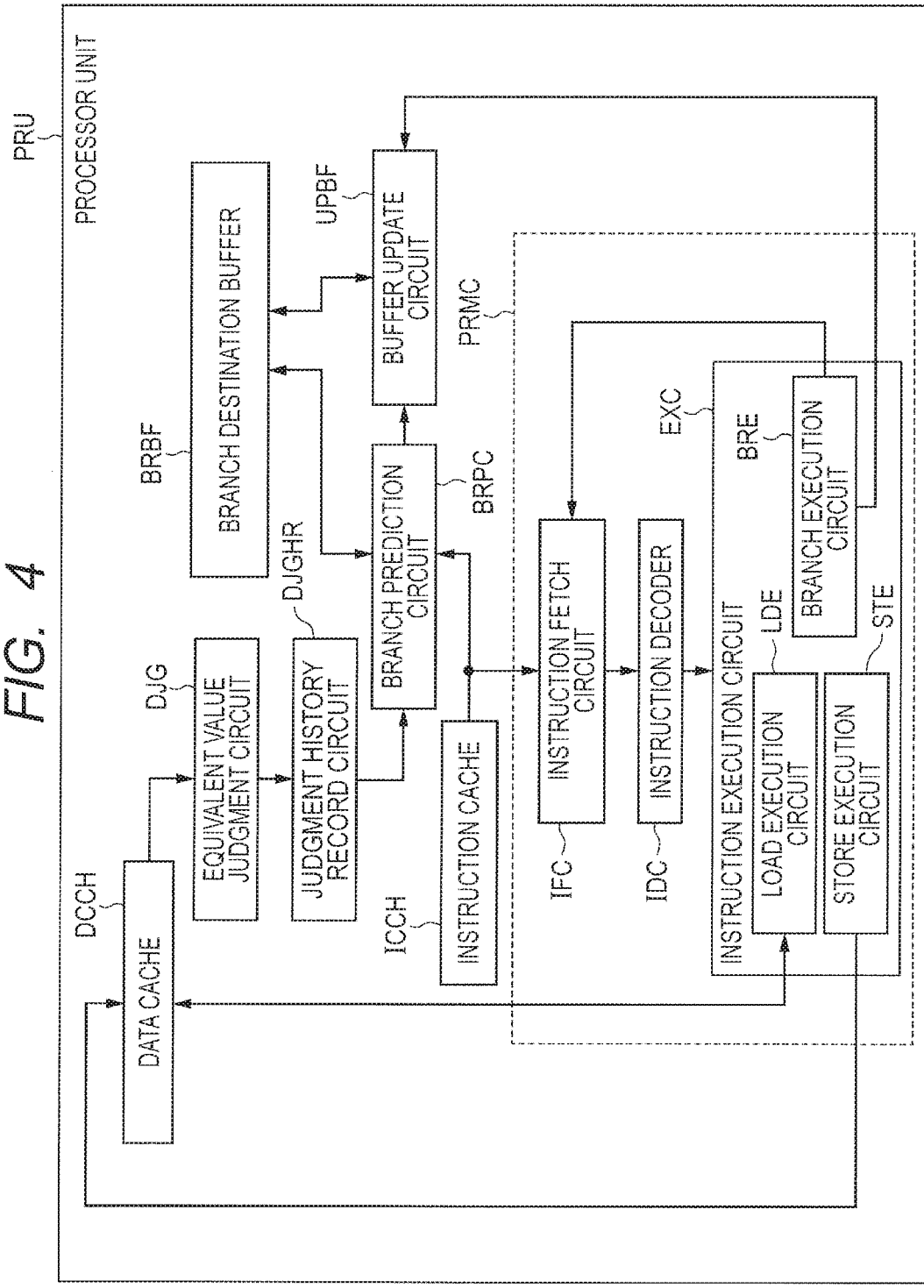
FIG. 4 is a block diagram showing, in detail, an example configuration of a processor unit in FIG. 1.

FIG. 4 is a block diagram showing a detailed configuration example of the processor unit in FIG. 1. The processor unit (processor device) PRU shown in FIG. 4 includes: a processor main-body circuit PRMC; a data cache DCCH; an instruction cache ICCH; an equivalent value judgment circuit DJG; a judgment history record circuit DJGHR; a branch destination buffer BRBF; a branch prediction circuit BRPC; and a buffer update circuit UPBF. The processor main-body circuit PRMC includes: an instruction fetch circuit IFC; an instruction decoder IDC; and an instruction execution circuit EXC. The equivalent value judgment circuit DJG, the judgment history record circuit DJGHR, the branch destination buffer BRBF, the branch prediction circuit BRPC, and the buffer update circuit UPBF substantially have the same function as described in FIGS. 3A to 3C.

The instruction cache ICCH caches an instruction code read from the memory MEM of FIG. 1. In this example, the processor unit PRU is provided with the instruction cache ICCH. However, the processor unit PRU may not be provided with the instruction cache ICCH and its configuration may be such that the instruction code is directly read from the memory MEM. An instruction fetch circuit IFC fetches the instruction code read from the instruction cache ICCH and the memory MEM, and transmits the instruction code read from the instruction cache ICCH and the memory MEM to the instruction decoder IDC. Moreover, the instruction fetch circuit IFC sends the fetched instruction address (IADR of FIG. 2, etc.) to the branch prediction circuit BRPC. Further, the instruction fetch circuit IFC receives a fetch direction (IFD of FIG. 2, etc.) of the branch destination address (prediction) BRADRp from the branch prediction circuit BRPC. Furthermore, the instruction fetch circuit IFC receives the branch destination address (result) BRADRr from the branch execution circuit BRE.

The instruction decoder IDC decodes the instruction code received from the instruction fetch circuit IFC, and directs the instruction execution circuit EXC to execute the decoded instruction. The instruction execution circuit EXC includes: a load execution circuit LDE; a store execution circuit STE; and a branch execution circuit BRE. The instruction execution circuit EXC includes, in fact, other various execution circuits. When an instruction directed by the instruction fetch circuit IFC is a load instruction, the instruction execution circuit EXC executes processing using the load execution circuit LDE. Further, if it is a store instruction, the instruction execution circuit EXC executes processing using the store execution circuit STE, and if it is a conditional branch instruction, executes processing using the branch execution circuit BRE.

Based on the description in the store instruction, the store execution circuit STE sends a store address and store data to the data cache DCCH. Based on the description in the load instruction, the load execution circuit LDE sends a load address to the data cache DCCH and receives load data from the data cache DCCH. The branch execution circuit BRE executes a conditional branch instruction and updates PC (Program Counter) of an instruction to be executed next. Also, when a branch destination prediction is a prediction miss, the branch execution circuit BRE nullifies a fetched instruction. Further, the branch execution circuit BRE sends the updated PC to the instruction fetch circuit IFC as a branch destination address (result) BRADRr (i.e., a correct instruction fetch address). Furthermore, the branch execution circuit BRE sends an instruction address IADR of the conditional branch instruction, the branch destination address (result) BRADRr, and a branch success/failure result to the buffer update circuit UPBF.

Figure 5:
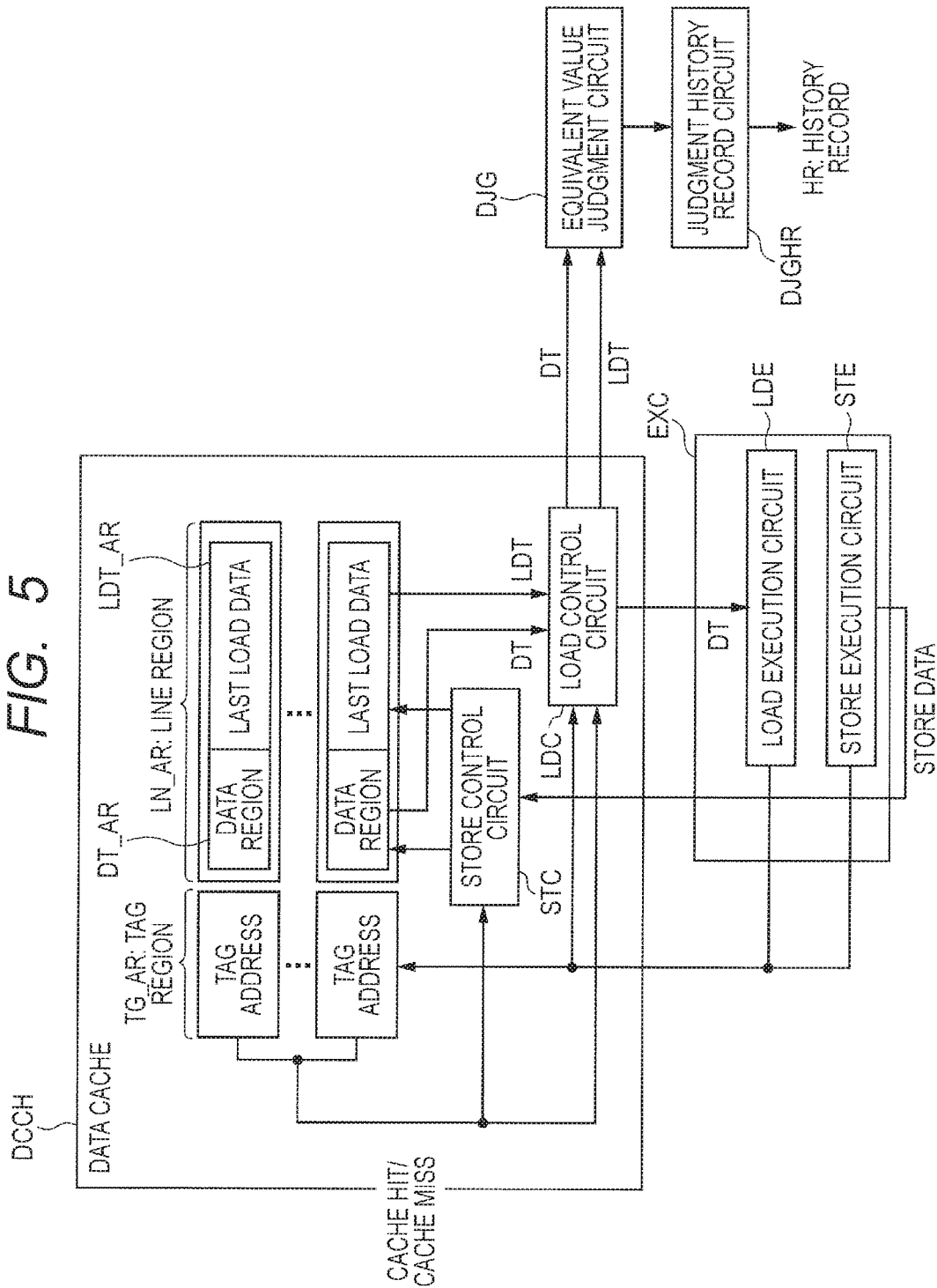
FIG. 5 is a block diagram showing, in detail, an example configuration of a data cache in FIG. 4.

FIG. 5 is a block diagram showing a detailed configuration example of a data cache in FIG. 4. The data cache DCCH shown in FIG. 5 includes, as a storage area, a plurality of entries each having a tag region TG_AR and a line region LN_AR. The tag region TG_AR stores a tag address corresponding to a load address or a store address. The line region LN_AR includes: a data region DT_AR which stores load data (for example, present load data corresponding to a present load instruction) or store data; and a last load data region LDT_AR which stores last load data (for example, previous load data corresponding to a previous load instruction). In addition, the tag region TG_AR is unnecessary when using a cache system, such as direct mapping, for example.

Further, the data cache DCCH includes a load control circuit LDC and a store control circuit STC as control circuits of respective entries. The load control circuit LDC receives a load address from the load execution circuit LDE. Further, the load control circuit LDC determines whether or not a tag address corresponding to the load address is stored in a tag region TG_AR of any one of the entries in the data caches DCCH (i.e., cache hit/cache miss). In the case of a cache miss, the load control circuit LDC reads memory data for a line length from a region corresponding to the tag address in the memory MEM. Further, the load control circuit LDC registers a new entry in the data cache DCCH using the tag address and the memory, data and selects the entry.

Moreover, in a case of a cache hit and when a line region LN_AR of a hit entry is valid (that is, cache data is the newest), the load control circuit LDC simply selects the hit entry. On the other hand, in the case of a cache hit and when a line region LN_AR of the hit entry is invalid (that is, memory data is the newest), the load control circuit LDC reads memory data for a line length from a region corresponding to a tag address in the memory MEM. Then, the load control circuit LDC refills the hit entry using the memory data and chooses the entry. In this regard, identification of being invalid depends on a caching system. For example, as a caching system, there is a system having a memory region in the line region LN_AR that indicates whether the line region LN_AR is invalid, and another circuit accesses the region. Also, there are systems in which identification is made uniquely with an address.

With respect to the entry thus chosen, the load control circuit LDC reads load data DT from the region corresponding to the load address in the data region DT_AR, and sends the load data DT to the load execution circuit LDE. In this regard, according to the embodiment, there is adopted an example in which a bit width (i.e., a line length) of the data region DT_AR is N times (N is an integer being two or greater) as large as each bit width (i.e., a loading size or a storing size) of the load data and the store data. Hereafter, a region corresponding to a load address is called a "load address region," and a region corresponding to a store address is called a "store address region".

Moreover, with respect to the chosen entry, the load control circuit LDC reads, from the load address region in the data region DT_AR and the load address region in a last load data region LDT_AR, load data DT and last load data LDT, respectively, and sends the load data DT and the last load data LDT to the equivalent value judgment circuit DJG. Furthermore, the load control circuit LDC updates the load address region in the last load data region LDT_AR with the load data DT.

The store control circuit STC receives a store address and store data from the store execution circuit STE. Further, the store control circuit STC judges whether a tag address corresponding to the store address concerned is stored in a tag region TG_AR of any one of the entries inside the data caches DCCH (i.e., a cache hit/cache miss). In a case of a cache miss, the store control circuit STC registers a new entry corresponding to the store address in the data cache DCCH. Then, the store control circuit STC reads memory data for a line length from a region corresponding to the tag address inside the memory MEM. Further, the store control circuit STC stores the memory data in the data region DT_AR and a last load data region LDT_AR of the entry, and selects the entry. On the other hand, in case of a cache hit, the store control circuit STC simply selects the hit entry. Thus, with respect to the selected entry, the store control circuit STC stores the store data in the store address region in the data region DT_AR.

As in the cases of FIGS. 3A to 3C, every time a load instruction is generated, the equivalent judgment circuit DJG judges accord/discord of the load data DT (i.e., the present load data) from the load control circuit LDC and the last load data LDT (i.e., the previous load data). The judgment history record circuit DJGHR records, in the history bit region SREG, the judgment results for N times (in the example of FIGS. 3A to 3C, 2 times) by the equivalent value judgment circuit DJG before a conditional branch instruction is generated as history records HR, respectively.

Figure 6:
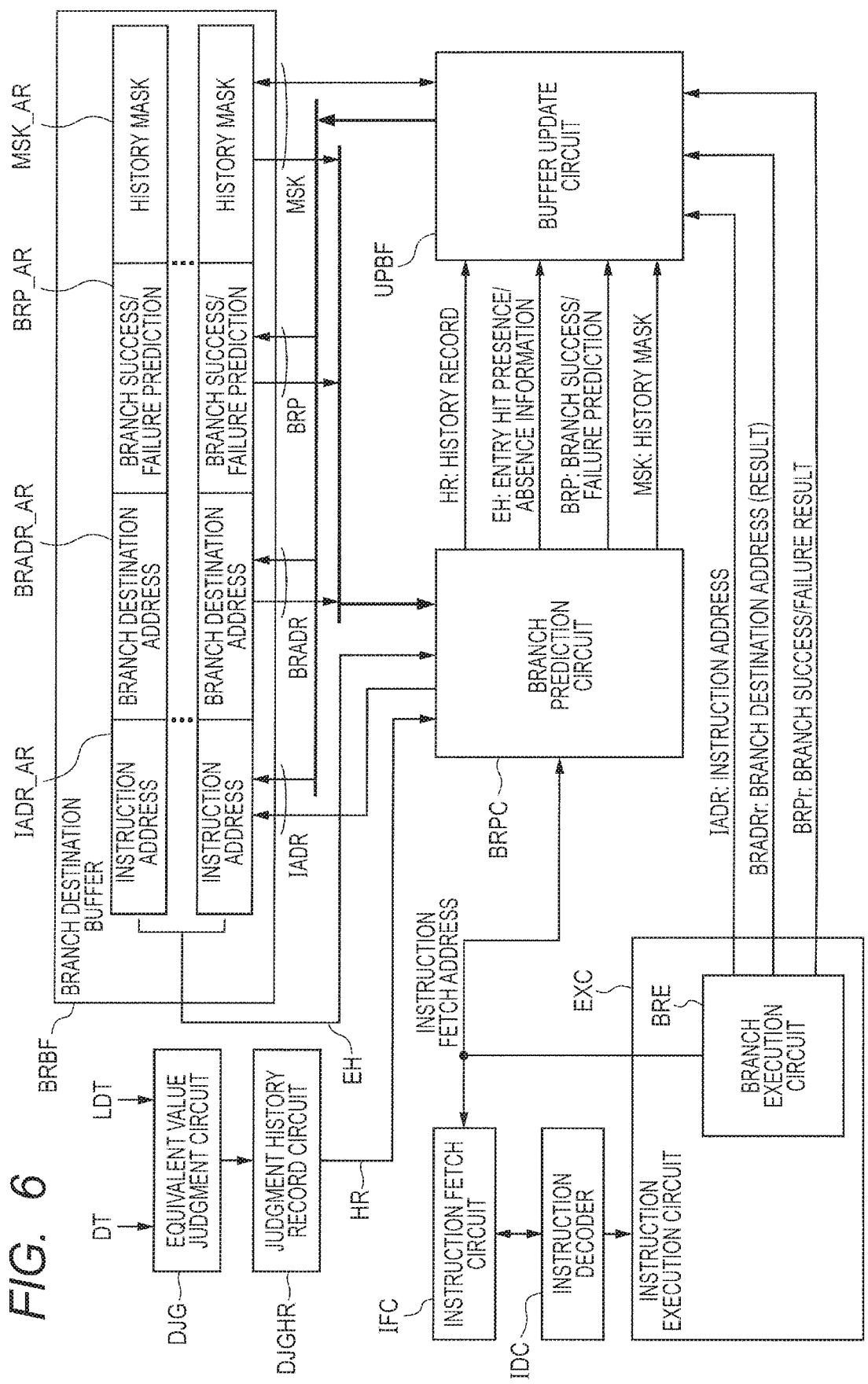
FIG. 6 is a block diagram showing, in detail, an example configuration of a periphery of a branch destination buffer in FIG. 4.

FIG. 6 is a block diagram showing a detailed configuration example of a periphery of a branch destination buffer in FIG. 4. The branch destination buffer BRBF includes a plurality of entries. In each entry, there is registered a mutual relationship of an instruction address of a conditional branch instruction, information on the previous branch destination, and a history mask. Specifically, each entry includes: an instruction address region IADR_AR in which an instruction address IADR of the conditional branch instruction is stored; a branch destination address region BRADR_AR and a branch success/failure prediction region BRP_AR in which information on the previous branch destination is stored; and a history mask region MSK_AR in which a history mask MSK is stored.

For example, the branch destination address at the time of the conditional branch instruction being established is stored in the branch destination addressing region BRADR_AR, as a branch destination address BRADR. For example, the branch success/failure result BRPr corresponding to the previous conditional branch instruction is stored in the branch success/failure prediction region BRP_AR as the branch success/failure prediction BRP. The branch success/failure prediction BRP includes bits for representing an established conditional branch as '1' (='T'), and an un-established conditional branch as '0' (='F'), for example. As described in FIG. 3A and etc., the history mask MSK includes a queue of bits which corresponds, bit by bit, to a queue of bits in the history bit region SREG. For example, when a variable corresponding to a K-th bit in the history bit region SREG is related to the branch destination prediction, the K-th bit value of the history mask MSK is set to '1'. Also, when the variable is not related, the value is set to '0'.

In addition, a description of the entry of the branch destination buffer BRBF should just be the description in which branch destination addresses at the time of being established and not being established of the conditional branch instruction can be understood, and is not limited in particular to the description as shown in FIG. 6. For example, here, the branch destination address of the un-established conditional branch instruction can be calculated from an instruction address IADR of the conditional branch instruction (for example, to be a next instruction address). However, if necessary, for example, each entry may further include a region holding a branch destination address at the time of the conditional branch instruction being un-established.

The branch destination buffer BRBF receives an instruction fetch address from the branch prediction circuit BRPC. Further, the branch destination buffer BRBF judges whether or not the instruction fetch address is stored in an instruction address region IADR_AR of one of entries (i.e., entry hit/entry miss). As entry hit presence/absence information EH, the branch destination buffer BRBF sends to the determination result to the branch prediction circuit BRPC. Moreover, in the case of the entry hit, the branch destination buffer BRBF sends the branch destination address BRADR of the entry, a branch success/failure prediction BRP, and a history mask MSK to the branch prediction circuit BRPC. On the other hand, in a case of an entry miss, the above information is not sent. However, the configuration may be such that an invalid value defined in advance is sent.

The branch destination buffer BRBF receives, from the buffer update circuit UPBF, the instruction address IADR of the conditional branch instruction, the branch destination address BRADR, a branch success/failure prediction BRP, and a history mask MSK. Further, based on the instruction from the buffer update circuit UPBF, the branch destination buffer BRBF updates or newly registers entries. In this regard, the instruction address IADR of the conditional branch instruction is defined by the branch execution circuit BRE. The branch destination address BRADR and the branch success/failure prediction BRP are defined based on the branch destination address (result) BRADRr from the branch execution circuit BRE and the branch success/failure result BRPr. The history mask MSK is computed by the buffer update circuit UPBF.

The branch prediction circuit BRPC receives an instruction fetch address from the instruction fetch circuit IFC, and transmits it to the branch destination buffer BRBF. Corresponding to this, the branch prediction circuit BRPC receives, from the branch destination buffer BRBF, the entry hit presence/absence information EH, a branch destination address BRADR, a branch success/failure prediction BRP, and a history mask MSK. In this regard, the branch success/failure prediction BRP expresses the branch success/failure result BRPr corresponding to the last conditional branch instruction. Moreover, the branch prediction circuit BRPC receives a history record HR from the judgment history record circuit DJGHR.

In a case of the entry hit, the branch prediction circuit BRPC predicts the success or failure of a conditional branch instruction using the received history record HR, a history mask MSK, and a branch success/failure prediction BRP. The branch prediction circuit BRPC defines the branch destination address (prediction) BRADRp according to the prediction result, and sends it to the instruction fetch circuit IFC as an instruction fetch address. That is, as shown in FIG. 2 and the like, the branch prediction circuit BRPC issues the fetch direction IFD of an instruction of a prediction branch destination to the instruction fetch circuit IFC. Moreover, the branch prediction circuit BRPC sends, to the buffer update circuit UPBF, the received history record HR, entry hit presence/absence information EH, branch success/failure prediction BRP, and a history mask MSK.

When the received entry hit presence/absence information EH shows an entry miss, using an instruction address IADR of the conditional branch instruction from the branch execution circuit BRE, the branch destination address (result) BRADRr, the branch success/failure result BRPr, and a history mask MSK initialized by itself, the buffer update circuit UPBF newly registers an entry in the branch destination buffer BRBF. On the other hand, when the received entry hit presence/absence information EH shows an entry hit, using a branch success/failure result BRPr from the branch execution circuit BRE and the history mask MSK calculated by itself, the buffer update circuit UPBF updates an entry to which the branch destination buffer BRBF corresponds.

Operation of Processor Unit (First Embodiment)

Process flows shown below may be performed simultaneously if the causal relationships are the same. Alternatively, the blocks including the same process contents may be performed as one process. Moreover, regarding the values to be received and sent, when there is no applicable value, any value may be sent and received as an invalid value. Also, it may be sent and received together with information indicating presence/absence of the value itself.

Figure 7:
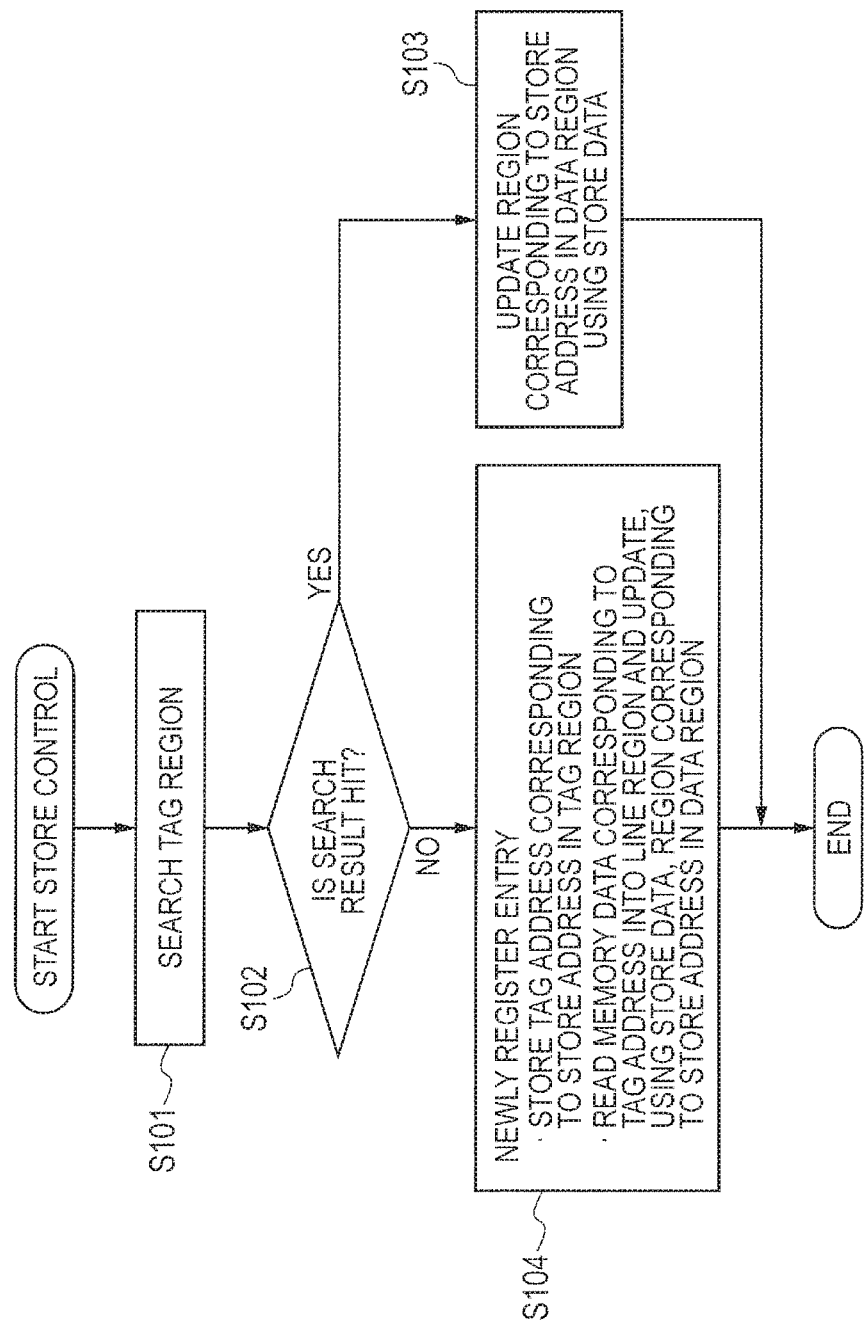
FIG. 7 is a flowchart showing one example of processing contents of a store control circuit in FIG. 5.

FIG. 7 is a flowchart showing one example of processing contents of a store control circuit in FIG. 5. The store control circuit STC searches to check whether or not there is a tag address corresponding to a store address in a tag region TG_AR of any one the entries of the data cache DCCH (steps S101 and S102). In other words, the store control circuit STC judges a cache hit/cache miss.

When the search result is a hit (cache hit), the store control circuit STC stores store data in a store address region in a data region DT_AR in the hit entry (step S103). On the other hand, when the search result is a cache miss hit (cache miss), the store control circuit STC newly registers an entry in the data cache DCCH (step S104). Specifically, the store control circuit STC stores a tag address corresponding to a store address in a tag region TG_AR of the new entry. Moreover, the store control circuit STC reads memory data for a line length from a region in the memory MEM corresponding to the tag address, and stores the memory data in a data region DT_AR and a last load data region LDT_AR of the new entry. Furthermore, the store control circuit STC stores store data in a store address region in the data region DT_AR of the new entry.

Figure 8:
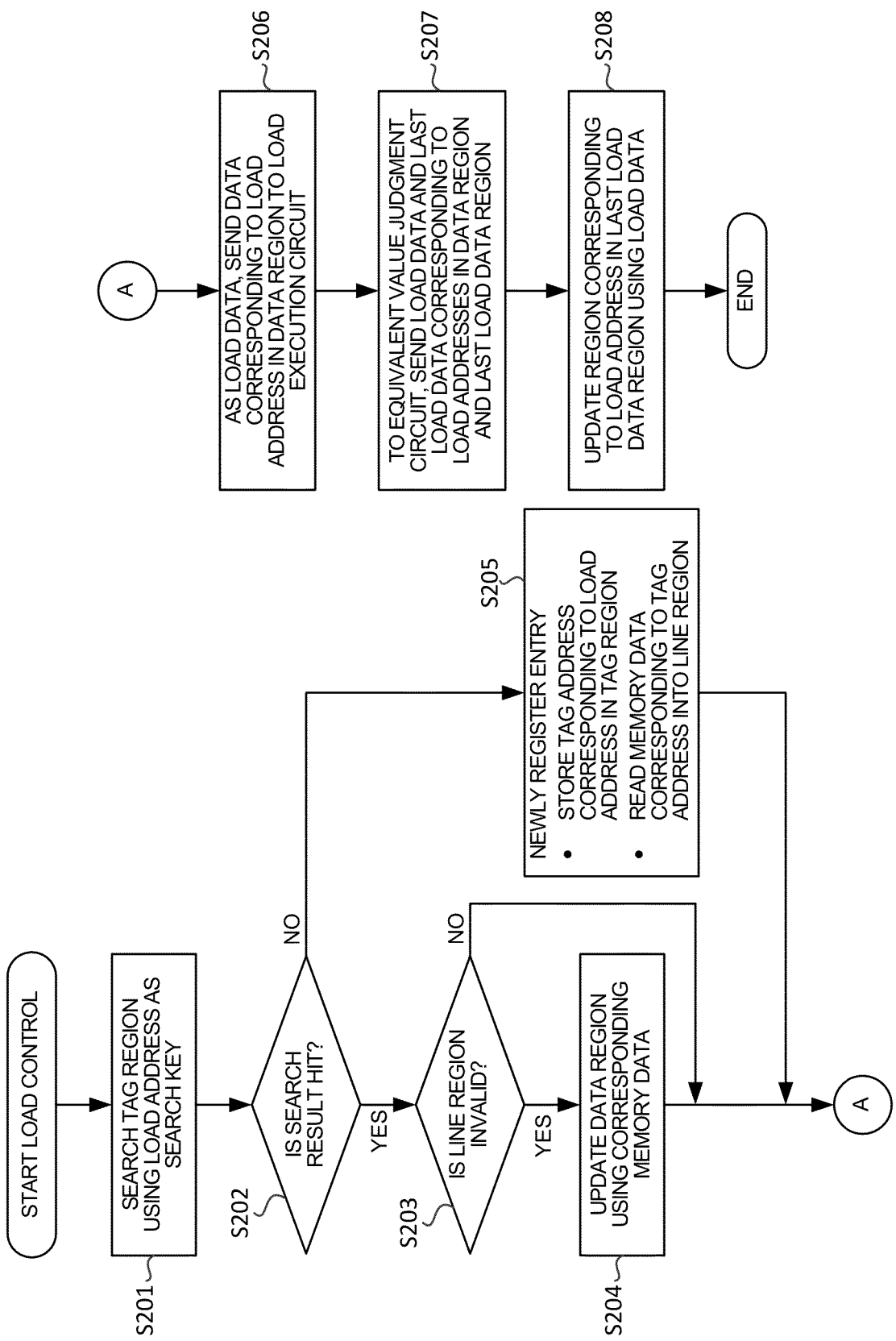
FIG. 8 is a flowchart showing one example of processing contents of a load control circuit in FIG. 5.

FIG. 8 is a flowchart showing one example of processing contents of a load control circuit in FIG. 5. The load control circuit LDC searches to check whether or not a tag address corresponding to a load address is stored in a tag region TG_AR of any one of the entries of the data cache DCCH (steps S201 and S202). In other words, the load control circuit LDC judges cache hit/cache miss.

When the search result is a hit (cache hit), the load control circuit LDC judges whether or not a line region LN_AR of the hit entry is valid (step S203). When the line region LN_AR of the hit entry is invalid, the load control circuit LDC proceeds to step S206 through step S204. When the line region LN_AR of the hit entry is not invalid, the load control circuit LDC directly proceeds to step S206. In step S204, the load control circuit LDC reads the memory data for a line length from the region in the memory MEM corresponding to the tag address of the hit entry, and stores the memory data in data region DT_AR of the entry.

On the other hand, in step S202, when the search result is a miss hit (cache miss), the load control circuit LDC newly registers an entry in the data cache DCCH (step S205). Specifically, the load control circuit LDC stores a tag address corresponding to a load address in a tag region TG_AR of the new entry. Moreover, the load control circuit LDC reads memory data for a line length from a region corresponding to the tag address in the memory MEM and stores the memory data in a data region DT_AR and a last load data region LDT_AR of the new entry. Subsequently, the process proceeds to step S206.

In step S206, in the target entry, the load control circuit LDC reads load data DT for a line length from a load address region in a data region DT_AR and sends the load data DT to a load execution circuit LDE. Then, in the target entry, the load control circuit LDC reads load data DT and last load data LDT from load address regions, respectively, in the data region DT_AR and in a last load data region LDT_AR, and sends load data DT and last load data LDT to the equivalent value judgment circuit DJG (step S207). Subsequently, the load control circuit LDC stores the read load data DT in the load address region in the last load data region LDT_AR (step S208).

Figure 9:
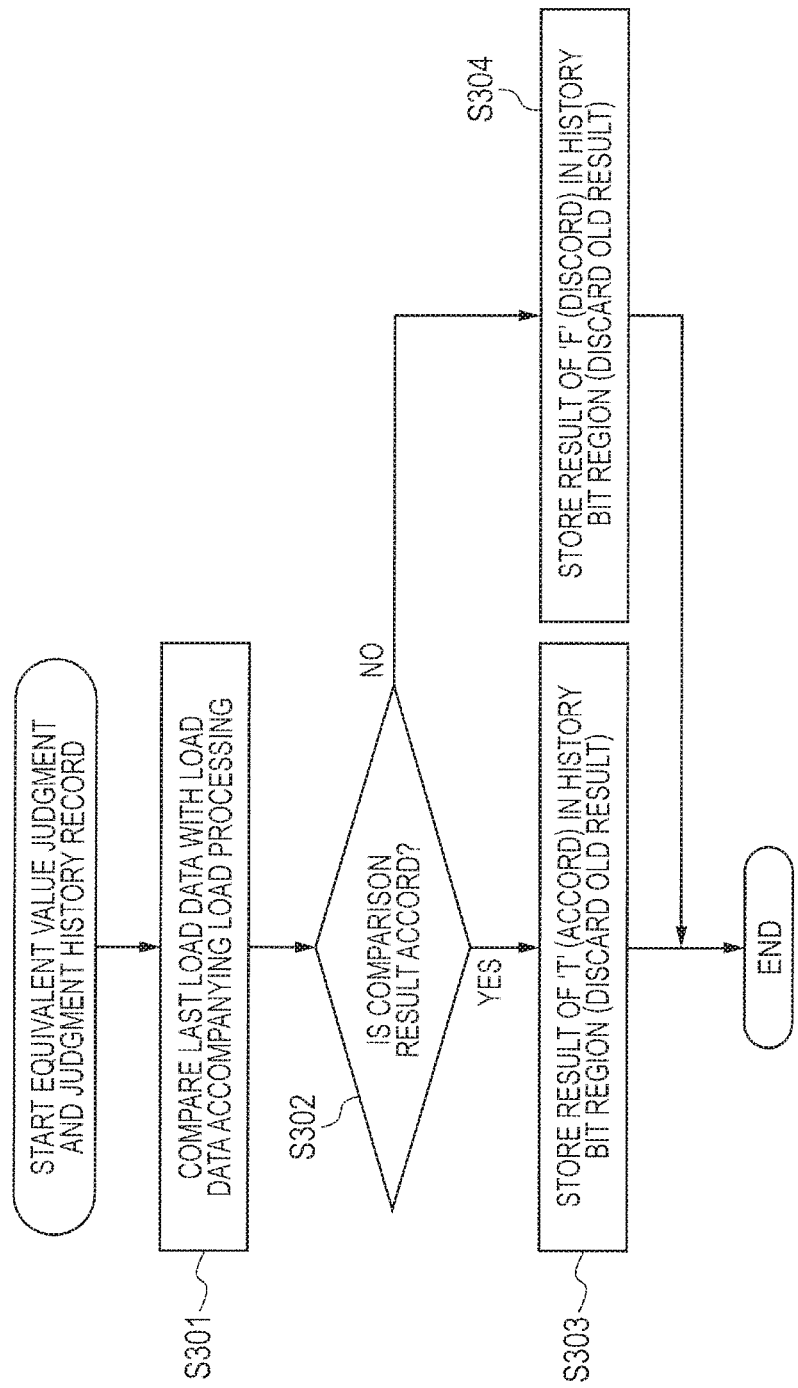
FIG. 9 is a flowchart showing one example of processing contents of an equivalent value judgment circuit and a judgment history record circuit in FIG. 5.

FIG. 9 is a flowchart showing examples of processing contents of an equivalent value judgment circuit and a judgment history record circuit in FIG. 5. The equivalent judgment circuit DJG compares load data DT received from the load control circuit LDVC with last load data LDT and sends the comparison result to the judgment history record circuit DJGHR (steps S301 and S302). When receiving a comparison result of 'T' (accord), the judgment history record circuit DJGHR stores 'T' (accord) in the newest bit of the history bit region (for example, shift register) SREG and discards the information on the oldest bit (step S303). On the other hand, upon receipt of a comparison result of 'F' (in discord), the judgment history record circuit DJGHR stores 'F' (in discord) in a newest bit of the history bit region SREG and discards the information on the oldest bit (step S304).

Branch Destination Prediction Method (First Embodiment)

Figure 10:
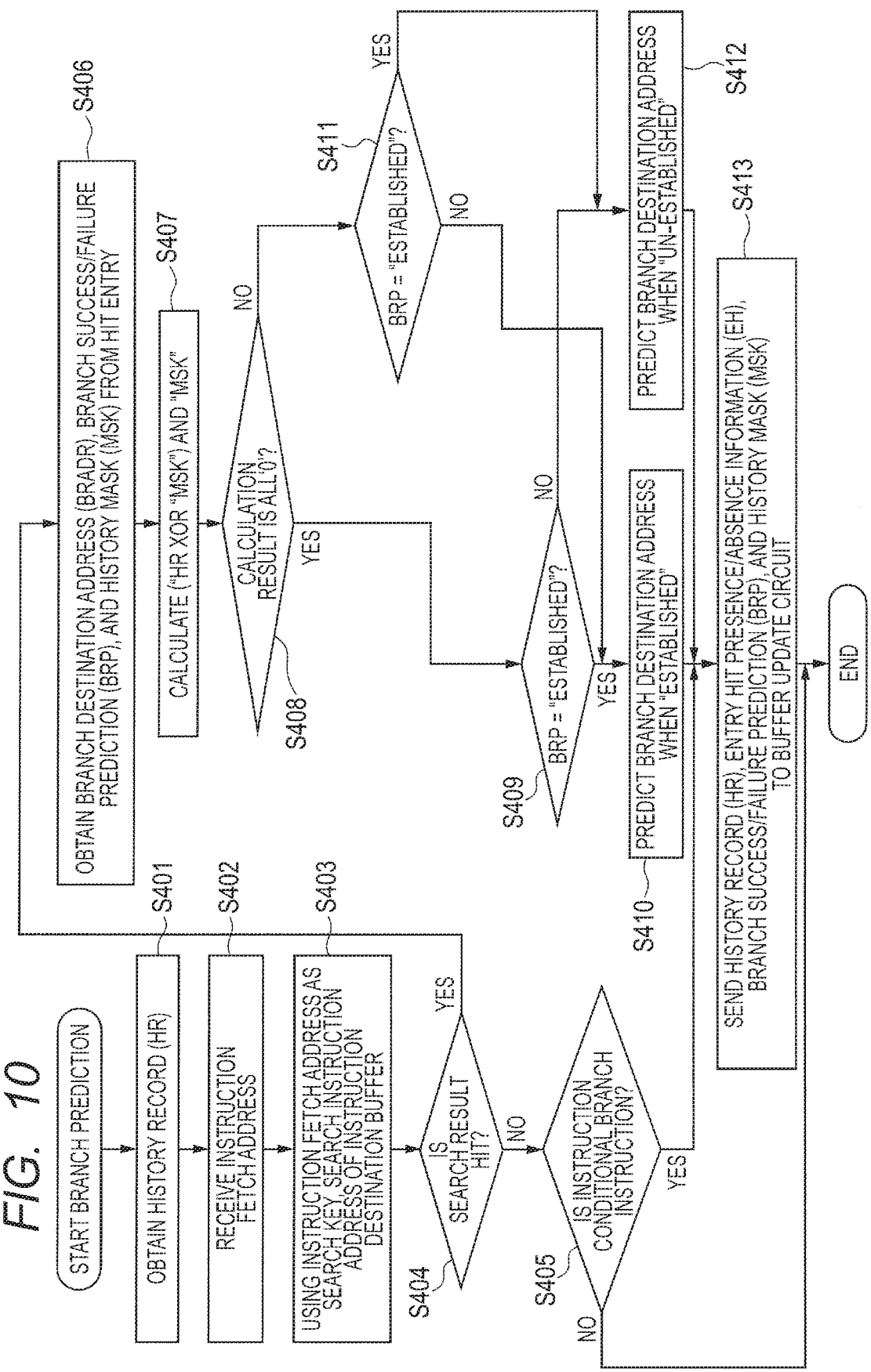
FIG. 10 is a flowchart showing one example of processing contents of a branch prediction circuit in FIG. 6.

FIG. 10 is a flowchart showing one example of processing contents of a branch prediction circuit in FIG. 6. The branch prediction circuit BRPC obtains a history record HR from the judgment history record circuit DJGHR (step S401) and receives an instruction fetch address from the instruction fetch circuit IFC (step S402). Using the received instruction fetch address as a search key, the branch prediction circuit BRPC searches an instruction address region IADR_AR of the branch destination buffer BRBF (steps S403 and S404). That is, the branch prediction circuit BRPC judges whether or not the instruction fetch address is stored in the instruction address region IADR_AR of any entry of the branch destination buffers BRBF (entry hit/entry miss).

In the case of an entry miss and when an instruction of the instruction fetch address is a conditional branch instruction (step S405), the branch prediction circuit BRPC sends, to the buffer update circuit UPBF, a history record HR, entry hit presence/absence information EH, a branch success/failure prediction BRP, and a history mask MSK (step S413). In this state, the entry hit presence/absence information EH indicates an entry miss, and the branch success/failure prediction BRP and the history mask MSK indicate, for example, an invalid value and the like.

On the other hand, in the case of an entry hit in step S404, the branch prediction circuit BRPC obtains, from the hit entry, a branch destination address BRADR, branch success/failure prediction BRP, and a history mask MSK (step S406). Then, with use of the history record HR and a history mask MSK, the branch prediction circuit BRPC calculates the formula of step S407 for every bit, and judges whether or not all the calculation results of the bits are '0' (step S408). In this regard, when (HR, MSK)=(F, 1), the value '1' is obtained in the formula of step S407 and, in the remaining cases, the value '0' is obtained. Therefore, with respect to the variables whose history mask MSK is '1' (related to the branch), the case where all the calculation results show '0' in step S408 means a case where all the history records HR of the variables show 'T' (with no change from the previous time).

In step S408, the calculation results do not necessarily have to be all '0' and, for example, judgment may be done according to the number of bits of '0'. The number of bits can be, for example, a value statistically obtained by experiments or a value set at random. In addition, by combining another branch destination prediction method, for example, when the calculation results are not all '0' in step S408, with use of the above another branch destination prediction method, further judgment can be done. Also, it is possible that a case where history masks MSK are all '0' is regarded as a branch instruction not depending on load data, and, with use of the above another branch destination prediction method, further judgment may be added.

When all the calculation results in step S408 are '0', the branch prediction circuit BRPC judges whether the branch success/failure prediction BRP acquired in step S406 (that is, the branch success/failure result in connection with the previous conditional branch instruction) is "established" or "un-established" (step S409). In the case where the branch success/failure prediction BRP is "established", the branch prediction circuit BRPC predicts a branch destination address at the time when the branch success/failure prediction BRP is "established" (i.e., the branch destination address BRADR obtained in step S406) (step S410). On the other hand, when the branch success/failure prediction BRP is "un-established", the branch prediction circuit BRPC predicts a branch destination address at the time when the branch success/failure prediction BRP is "un-established" (step S412).

A branch destination address of "un-established" can be, for example, an instruction address after the current instruction fetch address. Alternatively, in step S406, an instruction address IADR is further received, and a next instruction address may be used as the branch destination address at the time of "un-established." Moreover, for example, when providing a store region for the branch destination address at the time of "un-established" in the entry of the branch destination buffer BRBF, information in the region can be used. Thus, in step S408, when all the operation results are '0' (that is, there is no change in variables of the prediction target bits), the branch prediction circuit BRPC predicts the same branch destination as the previous branch destination. Then, the branch prediction circuit BRPC issues a fetch direction IFD being an instruction of the predicted branch destination address (prediction) BRADRp towards the instruction fetch circuit IFC.

Moreover, when all of the calculation results are not '0', the branch prediction circuit BRPC judges whether the branch success/failure prediction BRP acquired in step S406 (namely, the branch success/failure result corresponding to the previous conditional branch instruction) is "established" or "un-established" (step S411). In the case where the branch success/failure prediction BPR is "established", in step S412, the branch prediction circuit BRPC predicts a branch destination address at the time of "un-established." Alternatively, when the branch success/failure prediction BRP is "un-established", in step S410, the branch prediction circuit BRPC predicts a branch destination address at the time of "established." Thus, in step S408, when all of the calculation results are not '0' (that is, at least one of the variables of the prediction target bits has changed), the branch prediction circuit BRPC predicts a branch destination different from the previous one. Then, the branch prediction circuit BRPC issues a fetch direction IFD being an instruction of the predicted branch destination address (prediction) BRADRp towards the instruction fetch circuit IFC.

After step S410 or step S412, in step S413, the branch prediction circuit BRPC transmits a variety of information to the buffer update circuit UPBF, as described above, and it ends the process. In this regard, it is assumed that at least one bit of the history mask MSK is '1' (related to branch). That is, if all the bits of the history mask MSK are '0' (not related to branch), processes in steps S407 and S408 may become substantially meaningless. Therefore, in such a case, the flow of FIG. 10 can be changed so that another branch destination prediction method may be employed.

Branch Execution Method and History Mask Update Method (First Embodiment)

Figure 11:
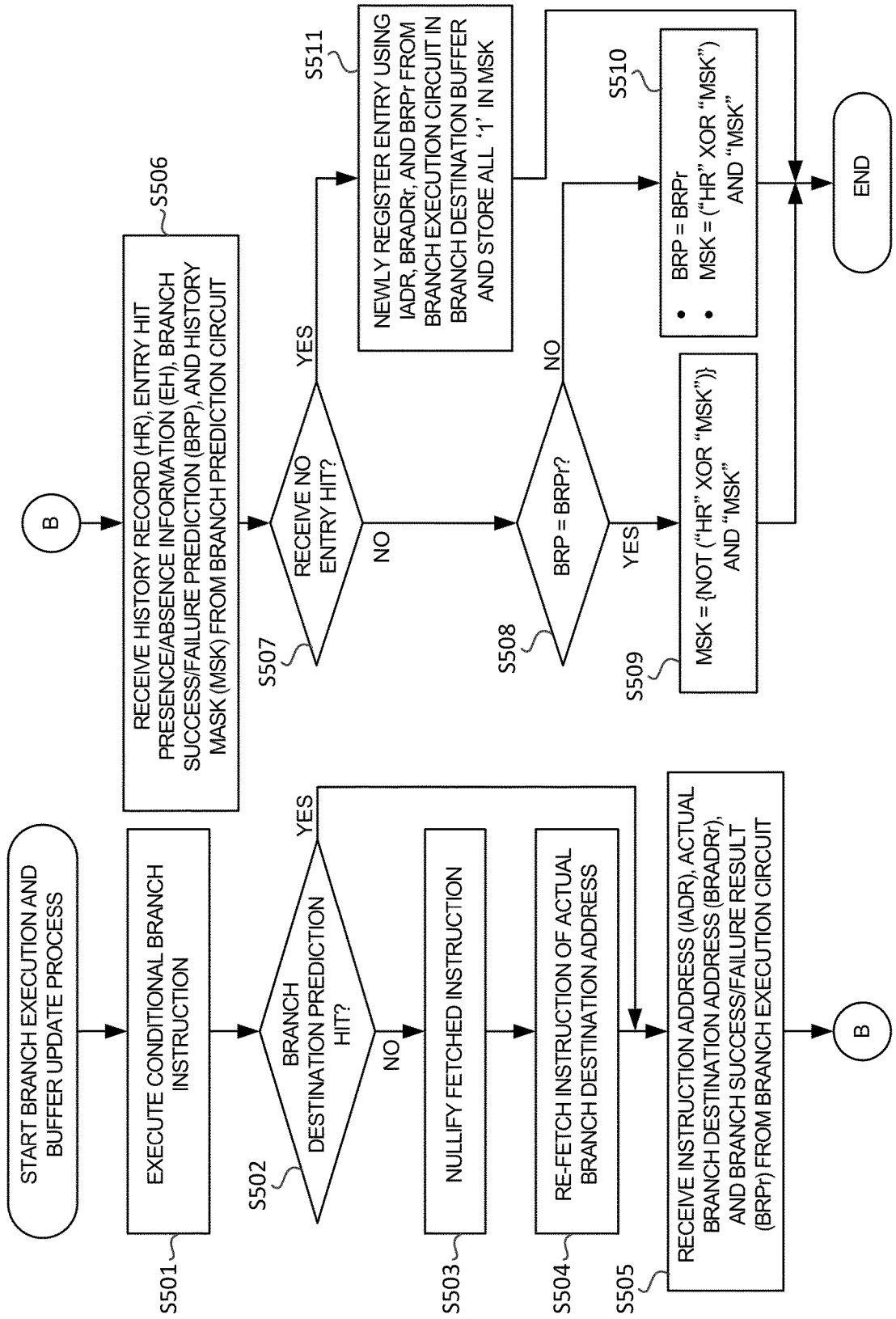
FIG. 11 is a flowchart showing examples of processing contents of a branch execution circuit and a buffer update circuit in FIG. 6.

FIG. 11 is a flowchart showing examples of processing contents of a branch execution circuit and a buffer update circuit in FIG. 6. The branch execution circuit BRE executes a conditional branch instruction, and updates PC (Program Counter) (step S501). When the branch destination prediction by the branch prediction circuit BRPC is a hit, the branch execution circuit BRE executes an instruction of the branch destination address without carrying out the stall of the instruction pipeline, and shifts to a process in step S505. That is, when the branch destination address (prediction) BRADRp by the branch prediction circuit BRPC and the branch destination address (result) BRADRr by the branch execution circuit BRE are in accord, since a fetch and decode of the branch destination address (prediction) BRADRp have already been performed according to the fetch direction IFD, a stall of the instruction pipeline does not happen.

On the other hand, when the branch destination prediction in step S502 is a prediction miss, the branch execution circuit BRE nullifies a fetched instruction (step S503). Subsequently, the branch execution circuit BRE proceeds to step S505 after ordering a re-fetch of an instruction (namely, an instruction of PC updated in step S501) of the branch destination address (result) BRADRr to the instruction fetch circuit IFC (step S504). In this case, an instruction pipeline's stall arises. Also, when entry is a mistake hit in the branch destination buffer BRBF, it proceeds to a process in step S505 without undergoing processes in steps S503 and S504.

In step S505, the buffer update circuit UPBF receives an instruction address IADR of a conditional branch instruction, the branch destination address (result) BRADRr, and the branch success/failure result BRPr from the branch execution circuit BRE. Moreover, the buffer update circuit UPBF receives a history record HR corresponding to step S401 of FIG. 10, an entry hit presence/absence information corresponding to steps S403 and S404, a branch success/failure prediction BRP and a history mask MSK corresponding to step S406 from the branch prediction circuit BRPC (step S506).

Subsequently, when the received entry hit presence/absence information EH indicates an entry miss (step S507), the buffer update circuit UPBF newly registers an entry, into branch destination buffer BRBF, using an instruction address IADR, the branch destination address (result) BRADRr, and the branch success/failure result BRPr corresponding to step S505 (step S511). Moreover, the buffer update circuit UPBF initializes each bit of the history mask MSK in the entry by '1' (related to branch) (step S511).

On the other hand, in step S507, when the entry hit presence/absence information EH indicates a hit, the buffer update circuit UPBF judges whether or not the branch success/failure prediction received in step S506 and the branch success/failure result BRPr received in step S505 are the same (step S508). That is, the buffer update circuit UPBF judges whether or not the previous branch destination and present branch destination are the same.

In step S508, when the previous branch destination and the present branch destination are the same, it is presumed that the variable which changed from the previous time is unrelated to the branch. Then, the buffer update circuit UPBF updates, with use of a formula in step S509, a history mask MSK of the target entry so that the variables changed this time (that is, the variable whose history record HR is 'F' (discord) may become a target bit for a mask. According to the formula in step S509, when (HR, MSK)=(F, 1), the history mask MSK is changed from '1' (related to branch) to '0' (unrelated to branch). In other cases, the value of the present history mask MSK is held as it is.

On the other hand, when the last branch destination differs from the present branch destination in step S508, it is presumed that the variables which has not changed from the previous time is unrelated to the branch. Then, with the operation expression of step S510, the buffer update circuit UPBF updates the history mask MSK of the target entry so that the variables which has not changed this time (that is, the variable whose history record HR is 'T' (accord)) may become a target bit for a mask. According to the operation expression of step S510, when (HR, MSK)=(T, 1), the history mask MSK is changed from '1' (related to branch) to '0' (not related to branch). In other cases, the value of the current history mask MSK is held as it is. Moreover, in step S510, the buffer update circuit UPBF updates the branch success/failure prediction BRP of the target entry of the branch destination buffer BRBF using the branch success/failure result BRPr received in step S505.

In addition, as a modification of the flow of FIG. 11, when a branch destination prediction in step S502 is a hit, it is also possible to end the process. In this case, it becomes possible to reduce the processing load required for the update of the branch destination buffer BRBF.

Major Effects of First Embodiment

As described above, with use of the method of First Embodiment, typically, it becomes possible to improve the hit ratio of the branch destination prediction. As a result, the occurrence frequency of the stall in an instruction pipeline can be reduced. Also, it becomes possible to reduce the processing time of the program (and, further, to achieve a high-speed control of the system) and etc. Specifically, according to the system of comparative examples described in FIGS. 21 to 23, as in mechanical control with use of a finite automaton and etc., when it is applied to a system where continuation of the same branch destination can hardly be expected, fall in the hit rate of the branch destination prediction is caused. On the other hand, according to the system of First Embodiment, branch destination prediction is performed based on variables (data) used as determinants of the branch destination. Therefore, even in the case of a system where the continuation of the same branch destination cannot be expected, it becomes possible to improve the hit rate of the branch destination prediction.

Second Embodiment

Configuration of Processor Unit (Second Embodiment)

Figure 12:
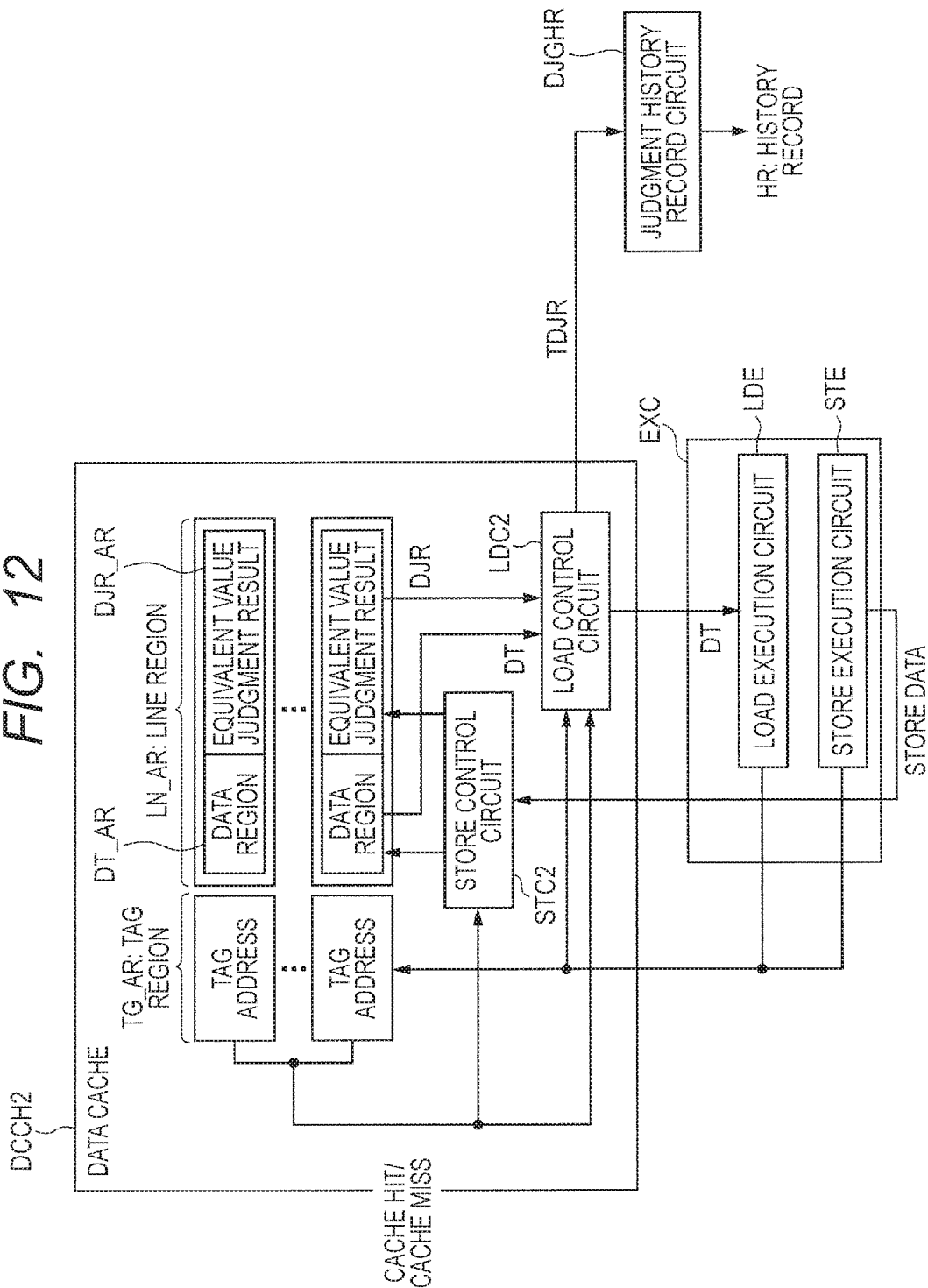
FIG. 12 is a block diagram showing, in detail, an example configuration of a data cache of FIG. 4 in a processor unit according to Second Embodiment of the present invention.

In a processor unit according to Second Embodiment of the present invention, FIG. 12 is a block diagram showing a detailed configuration example of a data cache in FIG. 4. The data cache DCCH2 of FIG. 12 differs from a data cache DCCH of FIG. 5 in that a line region LN_AR of each entry includes an equivalent value judgment result region DJR_AR holding an equivalent value judgment result DJR in place of a last load data region LDT_AR. Moreover, in connection with this, as compared with the data cache DCCH of FIG. 5, in the data cache DCCH2, the equivalent value judgment circuit DJG is removed, and processing contents of the store control circuit STC2 and the load control circuit LDC2 are also different.

An explanation will be given now mainly to a difference from data cache DCCH of FIG. 5. The equivalent value judgment result DJR is a bit queue which shows whether or not data in the data region DT_AR changes during the period of time from a point at which a process corresponding to the previous store instruction or the load instruction ends to a point at which a process corresponding to the present store instruction or a load instruction ends. Therefore, when updating the store address region in the data region DT_AR according to the store instruction, the store control circuit STC2 judges accord/discord of data before and after the update, and stores the judgment result in the equivalent value judgment result region DJR_AR. Moreover, when load control circuit LDC2 performs the refill of data region DT_AR according to a loading instruction, the load control circuit LDC2 judges accord/discord of the data before and after the refill, and stores the judgment result in equivalent judgment result region DJR_AR.

More specifically, every time a load instruction is generated, the load control circuit LDC2 judges regarding cache hit/cache miss. In the case of a cache miss, the load control circuit LDC2 newly registers an entry. Further, the load control circuit DC2 stores, in a data region DT_AR of the entry, memory data for a line length read from a region in the memory MEM corresponding to a tag address of the entry. Furthermore, the load control circuit LDC2 initializes all the bits of the equivalent judgment result DJR of the entry by 'T' (with no change).

Moreover, when a refill is necessary in spite of a cache hit (that is, a line region LN_AR of the hit entry is invalid), the load control circuit LDC2 reads the memory data for a line length from the region corresponding to the tag address in the memory MEM. Then, the load control circuit LDC2 judges accord/disaccord of the data of the data region DT_AR of the hit entry and the read memory data, for example, per byte. If the judgment result is the same, the load control circuit LDC2 updates the equivalent judgment result DJR of the equivalent judgment result region DJR_AR with a bit array having a value of 'T' (no change), and if the judgment result is different, the load control circuit LDC2 updates the equivalent judgment result DJR of the equivalent judgment result region DJR_AR with a bit array having a value of 'F' (changed). Thus, when carrying out a comparison judgment per byte, one eighth of the bit width of the data region DT_AR is sufficient for the bit width of the equivalent judgment result region DJR_AR.

After that, the load control circuit LDC2 reads the equivalent judgment result DJR of the load address region in the equivalent judgment result region DJR_AR in the hit entry. Then, the load control circuit LDC2 replaces the equal value judgment result DJR with a total equivalent value judgment result TDJR, and sends it to the judgment history record circuit DJGHR. When all the bits of the read equivalent value judgment result DJR are 'T' (no change), the load control circuit LDC2 regards the total equivalent value judgment result TDJR as 'T' (no change). Also, when any one of the bits has 'F' (with change), the load control circuit LDC2 regards the total equivalent value judgment result TDJR as 'F' (with change). Then, the load control circuit LDC2 sends the total equivalent value judgment result TDJR to the judgment history record circuit DJGHR and, then, initializes all the bits of the load address region in the equivalent value judgment result region DJR_AR by 'T' (no change).

Moreover, the load control circuit LDC2 updates the data region DT_AR of the hit entry with memory data and sends, to the load execution circuit LDE, data of the load address region in the data region DT_AR as load data DT.

Every time a store instruction is generated, the store control circuit STC2 judges cache hit/cache miss. In the case of a cache miss, the store control circuit STC2 newly registers an entry and stores, in the data region DT_AR of the entry, memory data for a line length read from a region in the memory MEM corresponding to the tag address of the entry. Furthermore, the store control circuit STC2 initializes all the bits of the equivalent value judgment result DJR of the entry by 'T' (no change).

Then, regardless of the cache hit/cache miss, the store control circuit STC2 judges accord/discord of data of the store address region in the data region DT_AR and the store data in the target entry per byte. When the judgment results are the same, the store control circuit STC2 updates the equivalent value judgment result DJR of the store address in the equivalent value judgment result region DJR_AR by 'T' (no change). Also, when the judgment results are different, the store control circuit STC2 updates the equivalent value judgment result DJR by a bit queue having a value of 'F' (with change).

Operation of Processor Unit (Second Embodiment)

Figure 13:
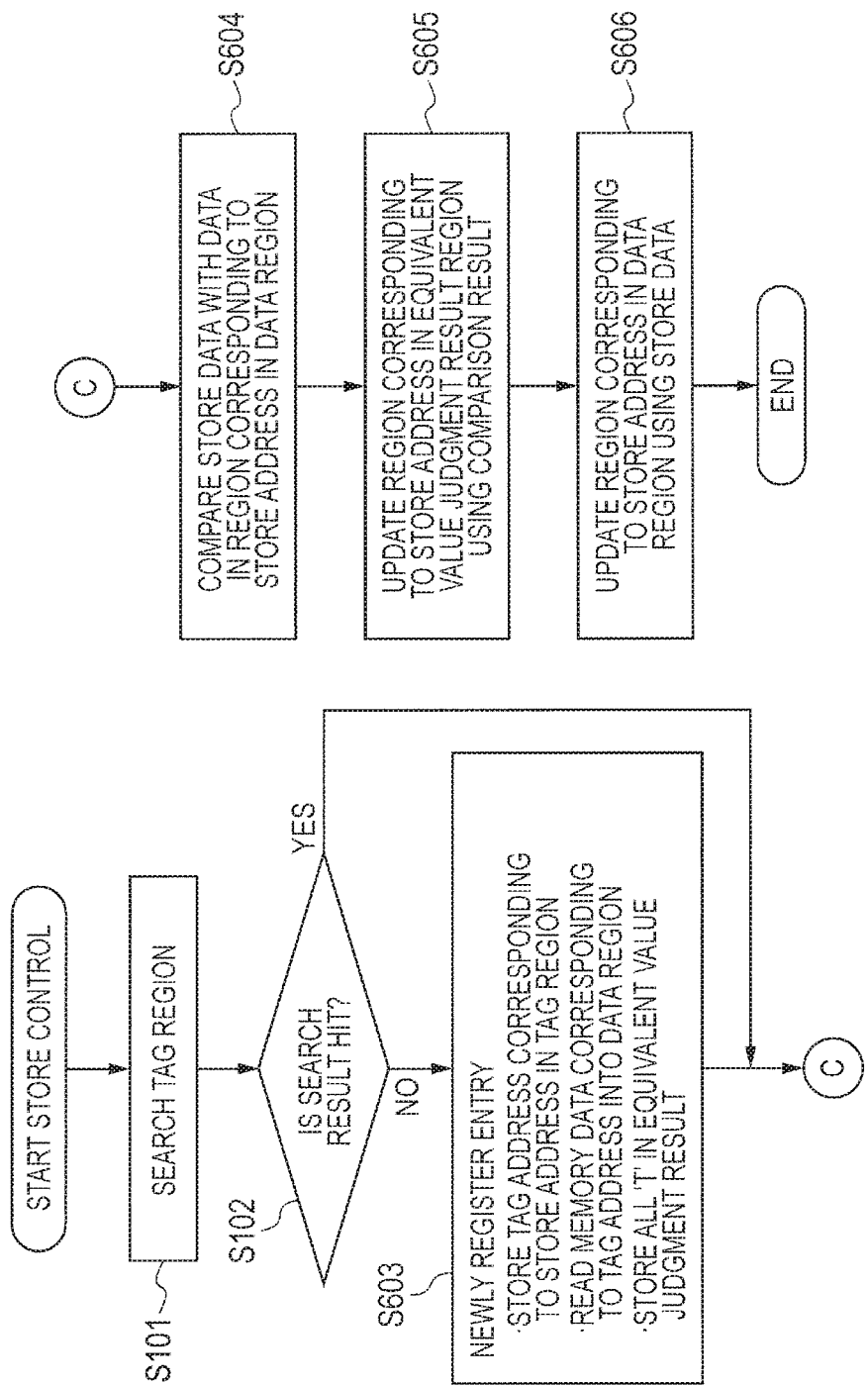
FIG. 13 is a flowchart showing one example of processing contents of a store control circuit in FIG. 12.

FIG. 13 is a flowchart showing one example of processing contents of a store control circuit in FIG. 12. As in the case of FIG. 7, the store control circuit STC2 judges whether it is a cache hit or a cache miss (steps S101 and S102). In a case of a cache hit, the store control circuit STC2 proceeds to step S604. Also, in the case of a cache miss, the store control circuit proceeds to step S604 through step S603.

In step S603, the store control circuit STC2 newly registers an entry in the data cache DCCH2. Specifically, the store control circuit STC2 stores a tag address corresponding to a store address in a tag region TG_AR of the new entry. Moreover, the store control circuit STC2 reads memory data for a line length from a region in the memory MEM corresponding to the tag address and stores the memory data in a data region DT_AR of the new entry. Furthermore, the store control circuit STC2 initializes all the bits of the equivalent judgment result DJR of the entry by 'T' (no change).

In step S604, the store control circuit STC2 compares data in a store address region in the data region DT_AR with store data per byte. Then, the store control circuit STC2 updates the store address region in the equivalent judgment result region DJR_AR with a bit queue having a value of 'T' (no change) when the comparison result is the same and a bit queue having a value of 'F' (with change) when different (step S605). Subsequently, the store control circuit STC2 updates the store address region in the data region DT_AR by store data (step S606).

Figure 14:
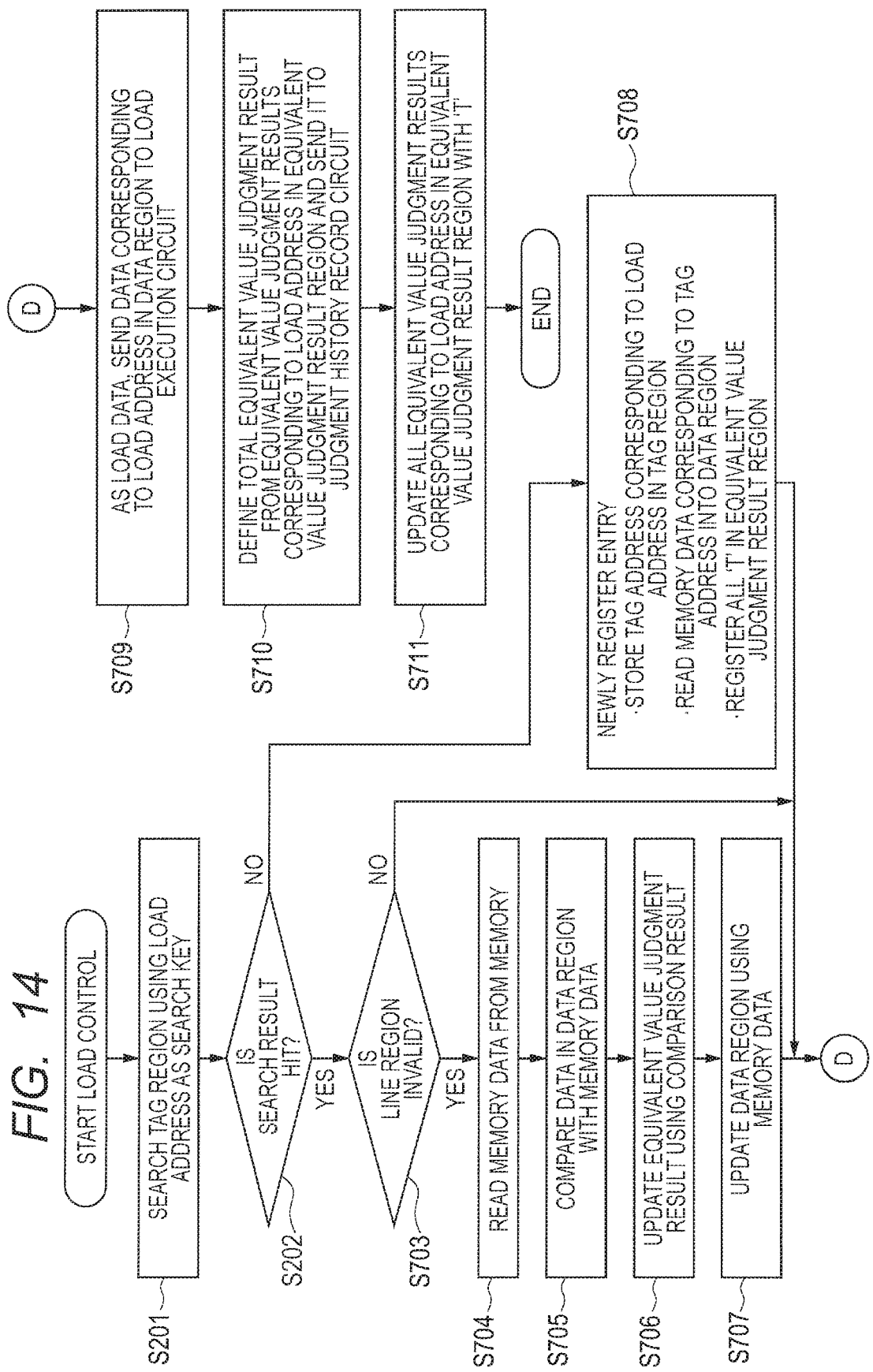
FIG. 14 is a flowchart showing one example of processing contents of a load control circuit in FIG. 12.

FIG. 14 is a flowchart showing one example of processing contents of a load control circuit in FIG. 12. As in the case of FIG. 8, the load control circuit LDC2 judges cache hit/cache miss (step S201 and S202). In the case of a cache miss, the load control circuit LDC2 newly registers an entry (step S708) and proceeds to step S709. In the case of a cache hit, after processing of steps S703 to S707, the process proceeds to step S709.

In step S708, specifically, the load control circuit LDC2 stores a tag address corresponding to a load address in a tag region TG_AR of the new entry. Moreover, the load control circuit LDC2 stores the memory data for a line length read from a region in a memory MEM corresponding to the tag address in a data region DT_AR of a new entry. Furthermore, the load control circuit LDC2 initializes all the bits of the equivalent judgment result DJR of the entry by 'T' (with no change).

On the other hand, in step S703, the load control circuit LDC2 judges whether or not a line region LN_AR of the hit entry is invalid. When it is invalid, after the processing of steps S704 to S707, the process proceeds to step S709. When it is not invalid, the process directly goes to step S709.

In step S704, the load control circuit LDC2 reads memory data for a line length from a region in the memory MEM corresponding to a tag address of the hit entry. Then, the load control circuit LDC2 compares data in the data region DT_AR with the read memory data per byte (step S705). When the comparison result of the load control circuit LDC2 is the same, the load control circuit LDC2 updates an equivalent value judgment result DJR of the target entry with a bit queue having a value of 'T' (with no change), and when the comparison results are different, the load control circuit LDC2 updates the equivalent value judgement result DJR of the target entry by a bit queue having a value of 'F' (with change) (step S706). Then, the load control circuit LDC2 stores the memory data read in step S704 in the data region DT_AR (step S707).

In step S709, the load control circuit LDC2 sends data in the load address region in the data region DT_AR to the load execution circuit LDE as load data DT. Moreover, the load control circuit LDC2 reads an equivalent value judgment result DJR of the load address region in the equivalent value judgment result region DJR_AR, defines the total equivalent value judgment result TDJR based on the equivalent value judgment result DJR, and sends it to the judgment history record circuit DJGHR (step S710). Specifically, when the bits of the equivalent value judgment result DJR in the load address region are all 'T' (no change), the load control circuit LDC2 regards the total equivalent value judgment result TDJR as 'T' (no change). Alternatively, when one of the bits is 'F' (changed), the load control circuit LDC2 regards the total equivalent value judgment result TDJR as 'F' (changed). Then, in step S711, the load control circuit LDC2 initializes all the bits of the load address region in the equivalent value judgment result region DJR_AR by 'T' (no change).

Major Effects of Second Embodiment

As described above, with use of the method of Second Embodiment, in addition to various effects described in First Embodiment, it becomes possible to reduce a circuit area of the data cache DCCH2. That is, according to the system of First Embodiment, by holding the previous load data, equality of the previous load data LDT and the present load data DT is judged. Therefore, there is required a last load data region LDT_AR whose data width is the same as that of the data region DT_AR. On the other hand, if there is a change in data during a period of time between the previous instruction (load instruction/store instruction) and the present instruction, the system of Second Embodiment is a system that leaves the equivalent value judgement result DJR in advance when performing the store and the refill based on the assumption that the previous load data and the present load data are different. Therefore, for example, as described above, when performing the equivalent value judgment per byte as described above, it becomes possible to allow the data width of the equivalent value judgment result region DJR_AR to be one eighth of the data region DT_AR. Moreover, for example, when performing the equivalent judgment by a word unit, the data width of the equivalent value judgment result region DJR_AR can be made one sixteenth of the data region DT_AR. Thus, reduction in circuit area can be achieved.

Third Embodiment

Configuration of Processor Unit (Third Embodiment)

Figure 15:
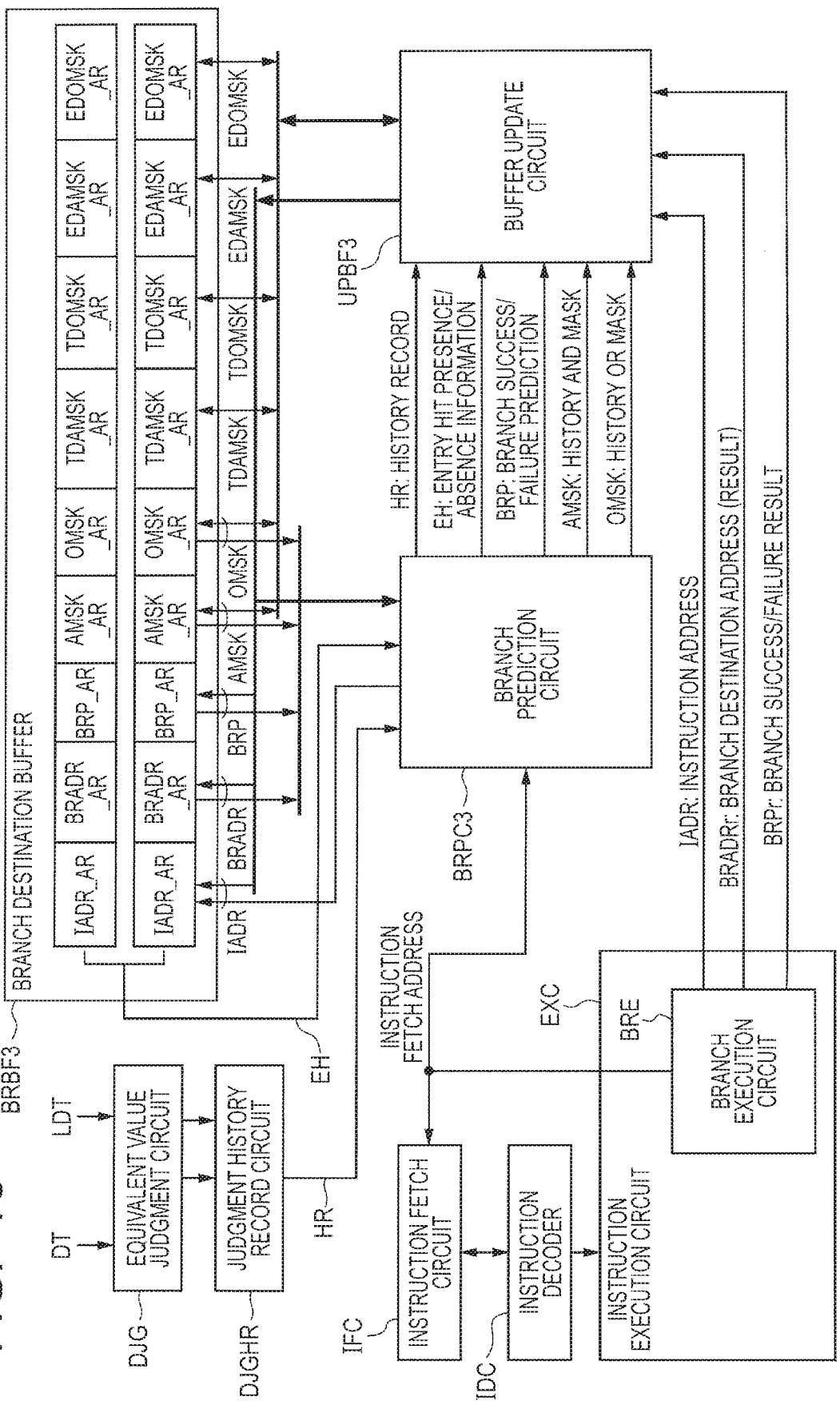
FIG. 15 is a block diagram showing, in detail, an example configuration of periphery of a branch destination buffer of FIG. 4 in a processor unit according to Third Embodiment of the present invention.

FIG. 15 is a block diagram showing a detailed configuration example of the periphery of the branch destination buffer of FIG. 4 in a processor unit according to Third Embodiment of the present invention. As compared to the branch destination buffer BRBF of FIG. 6, in a branch destination buffer BRBF3 shown in FIG. 15, the history mask region MSK_AR holding a history mask MSK is replaced with a history AND mask region AMSK_AR holding a history AND mask AMSK and a history OR mask region OMSK_AR holding a history OR mask OMSK.

Moreover, in order to define values of the history AND mask AMSK and the history OR mask OMSK, the branch destination buffer BRBF3 further includes: an established side invalid AND mask region TDAMSK_AR, an established side invalid OR mask region TDOMSK_AR, an un-established side invalid AND mask region EDAMSK_AR; and an un-established side invalid OR mask region EDOMSK_AR. The four regions (TDAMSK_AR, TDOMSK_AR, EDAMSK_AR, and EDOMSK_AR) hold an established side invalid AND mask TDAMSK, an established side invalid OR mask TDOMSK, an un-established side invalid AND mask EDAMSK, and an un-established side invalid OR mask EDOMSK, respectively. Moreover, although details will be described later, in accordance with such a change of the branch destination buffer BRBF3, the configuration and operation of the branch prediction circuit BRPC3 and the buffer update circuit UPBF3 are also different from those in FIG. 6.

In this regard, according to the system described in First Embodiment, as shown in FIGS. 3A and 3B, the variables without a change when a branch destination is different from the previous destination and the variables with a change when a branch destination is the same as the previous destination are defined as mask target bits. On the other hand, for example, when the branch destination is defined by a result of an OR calculation of the two variables A and B, the same branch destination is preserved unless one of the variable values of the variables A and B changes. In such a case, when the system of First Embodiment is applied, if the other of the variables A and B changes, the other variable becomes a mask target bit. As a result of continuing such a process, both the variables A and B may be mask target bits. In such a case, the branch destination prediction itself becomes difficult, which eventually lowers the hit rate of the branch destination prediction.

In view of the above, the history AND mask AMSK and the history OR mask OMSK are provided in Third Embodiment. Assuming a case where a branch destination is determined by AND relationship of some variables (for example, A, B) of a plurality of variables (for example, A to C) (for example, a conditional branch program, such as "if (A&B) then xx else yy"), and the history AND mask AMSK serves to specify the some variables (A, B). In the history AND mask AMSK, ideally, a mask value respectively corresponding to the part of these variables (A, B) is set to '1' (with an AND relationship), and a mask value corresponding to a remaining variable (C) is set to '0' (with no AND relationship).

Similarly, assuming a case where a branch destination is determined by OR relationship of some variables (for example, A, B) of a plurality of variables (for example, A to C) (for example, a conditional branch program such as "if (A|B)) then xx else yy"), and the history OR mask OMSK serves to specify the some variables (A, B). In the history OR Mask OMSK, ideally, the mask value respectively corresponding to a part of these variables (A, B) is set to '1' (with OR relationship), and the mask value corresponding to the remaining variables (C) is set to '0' (without OR relationship).

Branch Destination Prediction Method (Third Embodiment)

Figure 16:
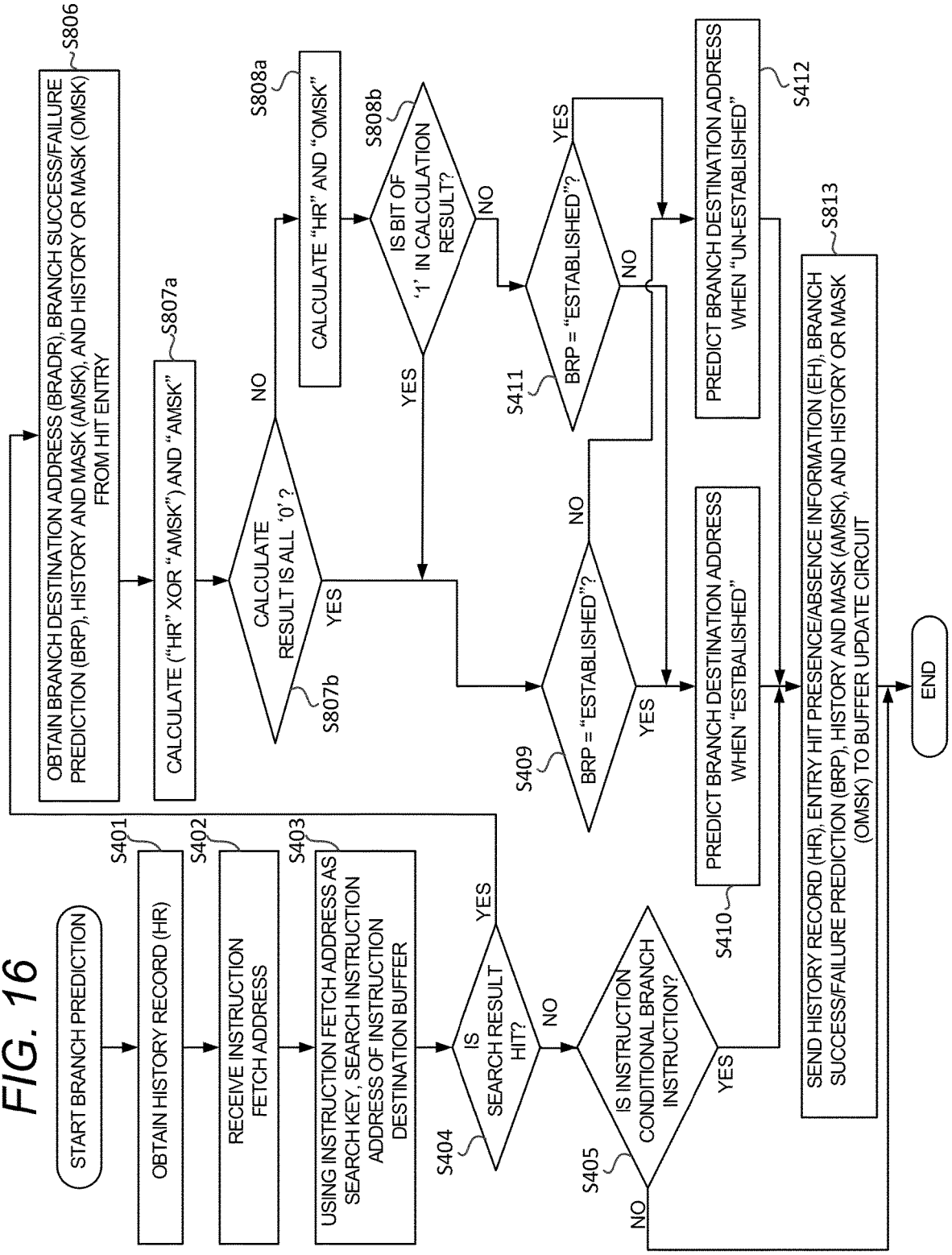
FIG. 16 is a flowchart showing one example of processing contents of a branch prediction circuit in FIG. 15.

FIG. 16 is a flowchart showing one example of processing contents of a branch prediction circuit in FIG. 15. As compared to the flow of FIG. 10, in the flow of FIG. 16, according to the change in information of the branch destination buffer BRBF3, processes in steps S406 and S413 of FIG. 10 are changed to processes in steps S806 and S813 of FIG. 16, respectively. Moreover, according to the change in branch destination prediction method, processes in steps S407 and S408 are changed to processes in steps S807a, S807b, S808a, and S808b.

In step S806, when there is an entry hit in step S404, the branch prediction circuit BRPC3 obtains a branch destination address BRADR, a branch success/failure prediction BRP, a history AND mask AMSK, and a history OR Mask OMSK from the hit entry. Moreover, in step S813, the branch prediction circuit BRPC3 sends a history record HR, entry hit presence/absence information EH, the branch success/failure prediction BRP, the history AND mask AMSK, and the history OR mask OMSK to the buffer update circuit UPBF3. That is, step S406 and the history mask MSK of S413 are replaced with the history AND mask AMSK and the history OR mask OMSK in step S806 and S813.

A branch destination prediction is performed by processing as follows in steps S807a, S807b, S808a, and S808b. First, in steps S807a and S807b, when history records HR of the prediction bits reflecting the history AND mask AMSK all indicate 'T' (accord), the branch prediction circuit BRPC3 predicts the same branch destination (preserves the present state) as the previous destination. On the other hand, when at least one of history records HR of the prediction bits reflecting the history AND mask AMSK indicates 'F' (discord), the process proceeds to steps S808a and S808b. In other words, with respect to variables of a bit whose history OR mask OMSK being a prediction target bit is '1' (with AND relationship), the branch prediction circuit BRP3 predicts, based on a characteristic of AND relationship, the same branch destination as the previous one unless at least one of the variables changes from the previous time.

As in the formula of step S407 of FIG. 10, when (HR, AMSK)=(F, 1), the formula of step S807a is set to '1', and, in the remaining cases, is set to '0'. Therefore, as in the case of step S408 in FIG. 10, the case where the calculation results are all '0' in step S807b means the case where history records of the variables whose history AND mask AMSK are '1' (with AND relationship) are all 'T' (no change from the previous time). When all result of an operations are '0', the same branch destination as the previous destination is defined as a branch destination address (prediction) BRADRp by processing of steps S409, S410, and S412 like the case in FIG. 10.

On the other hand, in steps S808a and S808b, among the history records HR of the prediction target bits reflecting the history OR mask OMSK, when at least one of them is 'T', (accord), the branch prediction circuit BRPC3 predicts the same branch destination as the previous destination (present state preserved).

Alternatively, when the history records HR of the prediction target bits all indicate 'F' (discord), the branch prediction circuit BRPC3 predicts a branch destination different from the previous destination. In other words, with respect to variables of the bit whose history OR mask OMSK being a prediction target bit is '1' (with OR relationship), based on a characteristic of OR relationship, unless at least one of the variables changes from the previous time, the branch prediction circuit BRPC3 predicts the same branch destination as the previous destination (preserves the present state).

In the formula of step S808a, when (HR, OMSK)=(T, 1), a value '1' is obtained, and, in the remaining cases, is set to '0'. Therefore, in step S808b, as for the case where a result of the calculation has a bit of '1', a history OR mask OMSK means that at least one or more 'T' (not changed from the previous time) exist in the history record HR of the variables of '1' (with OR relationship). When there is a bit of '1' in the calculation result, the same branch destination is defined as a branch destination address (prediction) BRADRp through processes in steps S409, S410, and S412. On the other hand, when there is no bit of '1' in the calculation result, as in the case shown in FIG. 10, through the processes in Steps S410, S411, and S412, a branch destination different from the previous destination is defined as the branch destination address (prediction) BRADRp.

Thus, when the history records HR of the prediction target bits based on the history AND mask AMSK all indicate accord, the branch prediction circuit BRPC3 predicts the same destination as the previous destination. Alternatively, when at least one among the history records HR of the prediction target bits based on the history OR mask OMSK also indicates accord, the branch prediction circuit BRPC3 predicts the same branch destination as the previous destination. On the other hand, the branch prediction circuit BRPC3 predicts a branch destination different from the previous destination when the same branch destinations as the previous destinations are not predicted in both the branch destination prediction with use of the history AND mask AMSK and the branch destination prediction with use of the history OR mask OMSK.

Branch Execution Method and History Mask Update Method (Third Embodiment)

Figure 17:
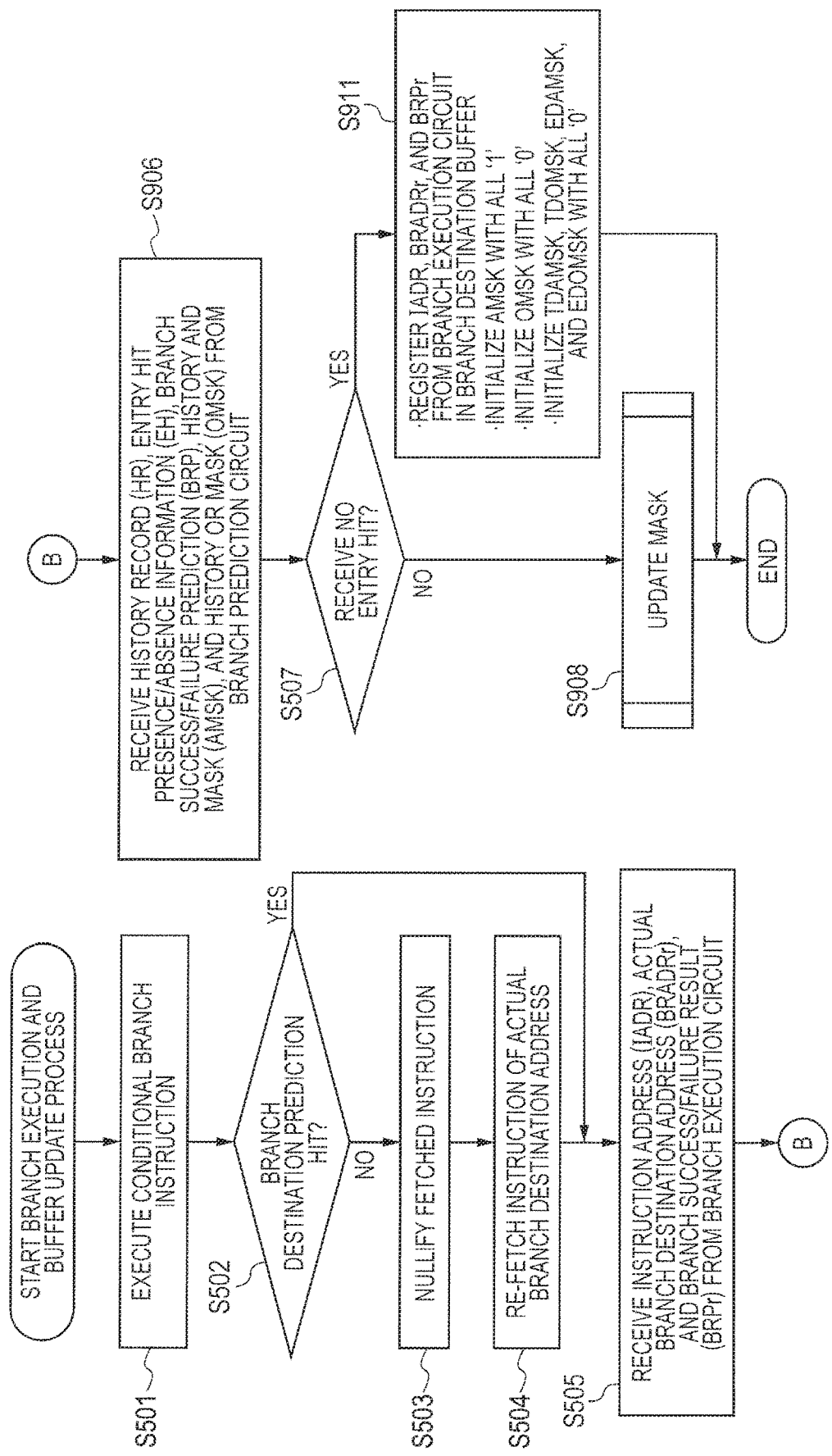
FIG. 17 is a flowchart showing examples of processing contents of a branch execution circuit and a buffer update circuit in FIG. 15.
Figure 18:
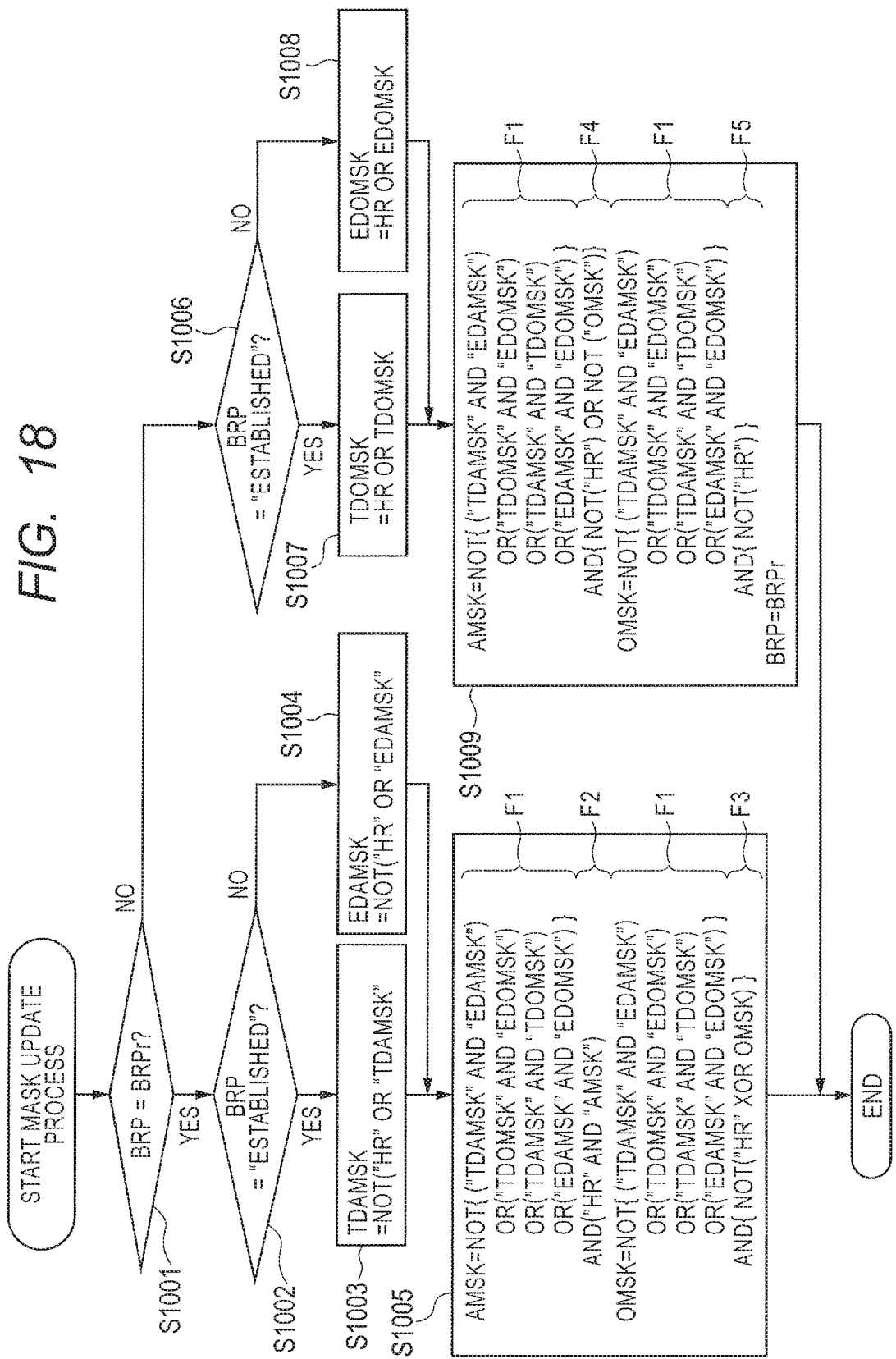
FIG. 18 is a flowchart showing one example of processing contents of a mask update process in FIG. 17.

FIG. 17 is a flowchart showing examples of processing contents of a branch execution circuit and a buffer update circuit in FIG. 15. FIG. 18 is a flowchart showing one example of processing contents of the mask update processing in FIG. 17. As compared to the flow of FIG. 11, in the flow of FIG. 17, according to the change in information of the branch destination buffer BRBF3, processes in steps S506 and S511 of FIG. 11 are changed for processes in steps S906 and S911 of FIG. 17, respectively. Moreover, according to the change in an update method of the history mask, processes in steps S508 to S510 are changed to a process in step S908 (i.e., a process in FIG. 18).

In step S906, from the branch prediction circuit BRPC3, the buffer update circuit UPBF3 receives a history record HR, entry hit presence/absence information EH, a branch success/failure prediction BRP, a history AND mask AMSK, and a history OR mask OMSK. That is, in step S906, the history mask MSK of step S506 is replaced with the history AND mask AMSK and the history OR mask OMSK in step S906.

In step S911, when the received entry hit presence/absence information EH indicates an entry miss (step S507), the buffer update circuit UPBF3 newly registers an entry in the branch destination buffer BRBF3 using an instruction address IADR, a branch destination address (result) BRADRr, and a branch success/failure result BRPr corresponding to step S505. Moreover, the buffer update circuit UPBF3 initializes each bit of the history AND mask AMSK in the entry by '1' (with AND relationship). Further, the buffer update circuit UPBF3 initializes each bit of the history OR mask OMSK by '0' (without OR relationship). Furthermore, the buffer update circuit UPBF3 initializes, by '0' (nullification disable), each bit of the established side invalid AND mask TDAMSK, an established side invalid OR mask TDOMSK, an un-established side invalid AND mask EDAMSK, and an un-established side invalid OR mask EDOMSK.

In step S908 (FIG. 17), substantially, first, the buffer update circuit UPBF3 updates the history AND mask AMSK and a history OR Mask OMSK so that variables unrelated to branch (namely, variables having no AND relationship or no OR relationship) may be excepted as mask target bits. In order to define these mask target bits, four kinds of invalid masks (established side invalid AND mask TDAMSK, the un-established side invalid AND mask EDAMSK, the established side invalid OR Mask TDOMSK, and an un-established side invalid OR Mask EDOMSK) are separately provided. In each invalid mask, '1' (nullification enable) is recorded to the variables suspected to be unrelated to branch, serially. With a combination of these invalid masks, finally, variables unrelated to the branch is specified.

As a result, with respect to the variables remaining after elimination of the variables unrelated to the branch, the buffer update circuit UPBF3 further narrows down the remaining variables into only the variables having AND relationship using the history AND mask AMSK and further narrows down into only the variables having OR relationship using a history OR Mask OMSK. Accordingly, it is expected that, for example, if a branch destination is decided by AND relationship of a predetermined variable, the value corresponding to the predetermined variable in the history AND mask AMSK converges on '1' (with AND relationship), and all the values of the history OR mask OMSK converge on '0' (without OR relationship). On the other hand, if a branch destination is determined by OR relationship of the predetermined variable, it is expected that the value corresponding to the predetermined variable in the history OR mask OMSK converges on '1' (with OR relationship), and all the values of the history AND mask AMSK converge on '0' (with no AND relationship).

Figure 19:
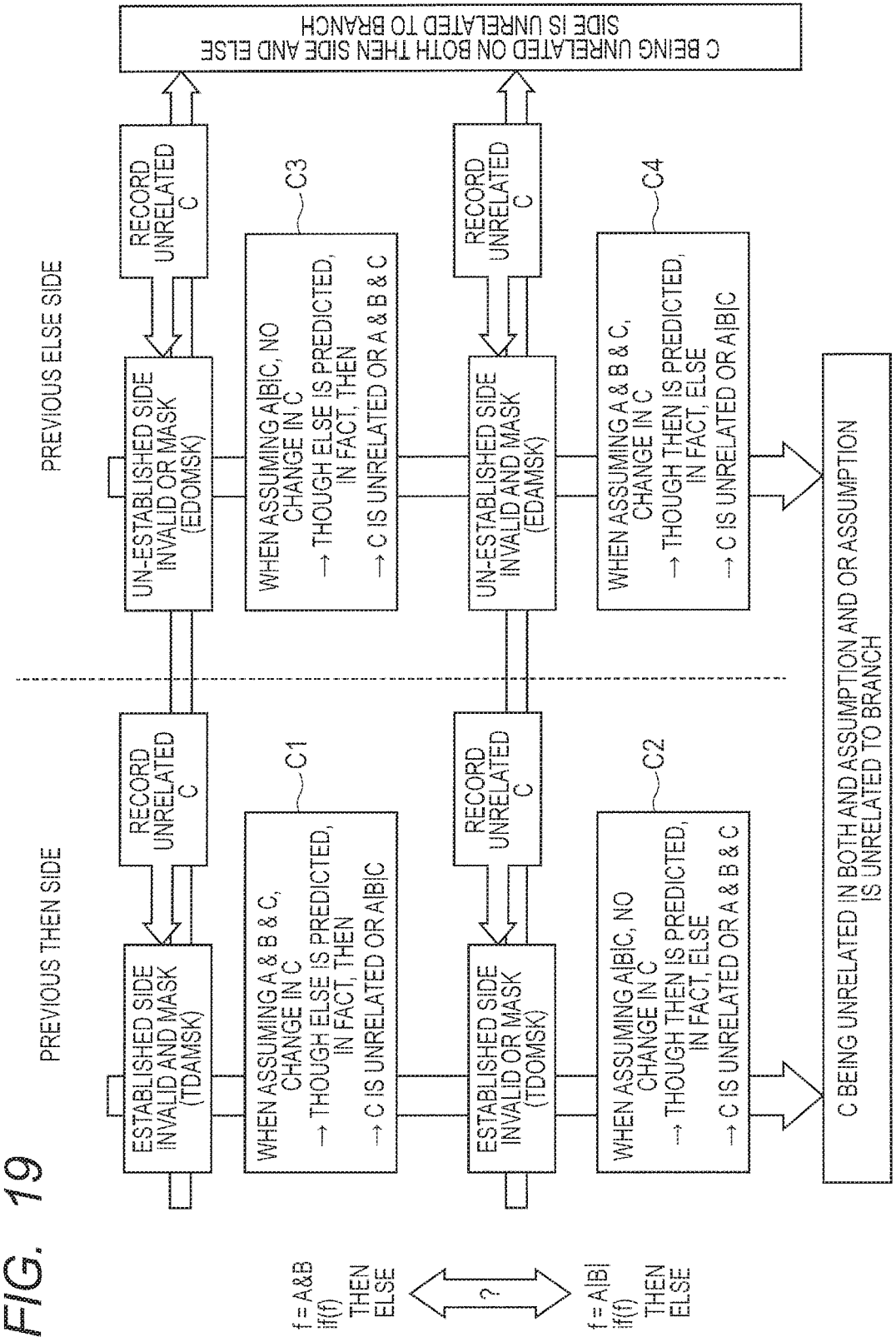
FIG. 19 is a supplementary diagram of FIG. 18 and is an explanatory diagram showing a mechanism for eliminating variables unrelated to a branch.

FIG. 19 is a supplementary diagram of FIG. 18 and is a diagram for explaining a mechanism for eliminating variables unrelated to the branch. For example, in a case C1, there is assumed a case where, in a conditional branch program such as "if (A&B (&C?)) then xx else yy", the previous branch success/failure result is a branch established (then). In such a case, it is verified whether or not the variable C has an AND relationship to variables A and B. When the variable C has an AND relationship and the variable value of the variable C has changed, the branch destination becomes different (else) from the previous one. Therefore, when a branch destination this time becomes the same as the previous one (then) even though the history record HR of the variables C is 'F' (changed from the previous time), the variable C becomes a variable unrelated to an AND relationship. Therefore, the established side invalid AND mask TDAMSK of the variable C is changed to '1' (nullification enable). Also, in the case C1, there remain possibilities for the variable C to have OR relationship and not to be related to the branch at all.

With regard to a case C2, for example, in a conditional branch program such as "if (A|B (|C?)) then xx else yy", it is assumed that the previous success/failure result is a branch materialized (then). In such a case, it is verified whether or not the variable C has an OR relationship to variables A and B. When the variable C has OR relationship and there is no change in the variable value of the variable C, the present branch destination can be the same branch destination (then) as the previous one. Therefore, when the branch destination this time becomes different from the previous branch destination (else) even though the history record HR of the variable C was 'T' (no change from the previous time), the variable C is regarded as a variable unrelated to OR relationship. Therefore, the established side invalid OR mask TDOMSK of the variable C is changed to '1' (nullification enable). In addition, in the case C2, there remain possibilities for the variable C to have an AND relationship and to be completely unrelated to a branch.

With regard to a case C3, for example, in a conditional branch program such as "if (A|B (|C?)) then xx else yy", it is assumed that the previous branch success/failure result is a branch un-established (else). In the case like this, it is verified whether or not the variable C has OR relationship to the variables A and B. If the variable C has OR relationship and when there is no change in the variable value of the variables C, it is very likely that the branch destination is the same as the previous destination (else). Therefore, when a branch destination becomes different from the previous destination (then), the variable C is regarded as a variable unrelated to OR relationship even though a history record HR of the variable C is 'T' (no change from the previous one) this time. Then, an un-established side invalid OR mask EDOMSK of the variable C is changed to '1' (nullification enable). In addition, in the case C3, there remain possibility of the variable C being related to AND relationship and possibility of not related to the branch at all.

With regard to a case C4, for example, in a conditional branch program such as "if (A&B (&C?)) then xx else yy", there is assumed a case where the previous branch success/failure result is branch un-established (else). In such a case, it is verified whether or not the variable C has an AND relationship to the variables A and B. If the variable C has the AND relationship and when the variable value of the variable C has changed, a branch destination is very likely to be different from the previous time (then). Therefore, when a branch destination is the same as the previous destination (else), the variable C is regarded as a variable unrelated to AND relationship even though a history record HR of the variables C is IF' (changed from the previous one) this time. Therefore, the value of the un-established side invalid AND mask EDAMSK of the variable C is changed for '1' (nullification enable). In addition, in the case C4, there remain possibility of the variable C being related to the OR relationship and possibility of being completely unrelated to the branch.

Here, for example, the variable C which is judged as not related in both the case C1 and the case C4 (i.e., both the branch established (then) side and the branch un-established (else) side) and the variable C which is judged as not related both the case C2 and the case C3 (both the branch established side and the branch un-established side) are regarded as the variable unrelated to the branch. Furthermore, the variable C judged to be unrelated in both the case C1 and the case C2 (i.e., both AND relationship and OR relationship) and the variable C judged to be unrelated in both the cases C3 and C4 (both AND relationship and OR relationship) are also regarded as the variables unrelated to the branch.

In steps S1001, S1002, and S1006 of FIG. 18, with use of the branch success/failure prediction BRP (i.e., the previous branch success/failure result) and the branch success/failure result BRPr (i.e., the present branch success/failure result), the buffer update circuit UPBF3 judges the cases C1 to C4 shown in FIG. 19. Steps S1003 and S1004 in FIG. 18 are processing corresponding to the cases C1 and C4 in FIG. 19, and the processing for recording C which is unrelated to AND relationship.

According to the formula of steps S1003 and S1004, when (HR, TDAMSK (or EDAMSK))=(F, 0), the value of the established side invalid AND mask TDAMSK (or the un-established side invalid AND mask EDAMSK) is changed from '0' to '1'. In the remaining cases, the present state is maintained. That is, when the branch destination is the same as the previous one even though the history record HR of a certain variable C was (changed from the previous time), the variable C is regarded as a variable unrelated to AND relationship. Accordingly, the value of the variable C of the established side invalid AND mask TDAMSK (or the un-established side invalid AND mask EDAMSK) is changed to '1' (nullification enable).

In connection with steps S1001 and S1002, when the previous branch destination and the present branch destination are both the branch destination at the time of the branch established (then), step S1003 (case C1) is executed. In this case, the buffer update circuit UPBF3 cumulatively record, in the established side invalid AND mask TDAMSK, the bits whose history record HR is (discord) in the history bit region SREG. In connection with steps S1001 and S1002, when the previous branch destination and the present branch destination are both the destination at the time of the branch un-established (else), step S1004 (case C4) is executed. In this case, the buffer update circuit UPBF records cumulatively the bits whose history record HR is 'F' (discord) in the history bit region SREG in the un-established side invalid AND mask EDAMSK.

Steps S1007 and S1008 of FIG. 18 are processing corresponding to the cases C2 and C3 of FIG. 19, respectively, and also are processing for recording C which is unrelated to OR relationship. According to the formula in steps S1007 and S1008, when (HR, TDOMSK (or EDOMSK))=(T, 0), the value of the established side invalid OR mask TDOMSK (or the un-established side invalid OR mask EDOMSK) is changed from '0' to '1'. Also, in the remaining cases, the current status is maintained. That is, when the branch destination is different from the previous one even though a history record HR of a certain variable C is 'T' (not changed from the previous time), the variable C is regarded as a variable unrelated to the OR relationship. Accordingly, the value of the established side invalid OR mask TDOMSK (or an un-established side invalid OR mask (EDOMSK)) of the variable C is changed to '1' (nullification enable).

In connection with steps S1001 and S1006, when the previous branch destination is a branch destination at the time of the branch established (then) and the present branch destination is a branch destination at the time of the branch un-established (else), step S1007 (case C2) is executed. In this case, in the history bit region SREG, the buffer update circuit UPBP3 cumulatively records the established side invalid OR mask TDOMSK, the bits whose history record HR is 'T' (accord). In connection with steps S1001 and S1006, when the previous branch destination is a branch destination at the time of the branch being un-established (else) and when the present branch destination is the one at the time of the branch being established (then), steps S1008 (case C3) is executed. In this case, in the history bit region SREG, the buffer update circuit UPBF3 records, cumulatively, the bits whose history records HR are 'T' (accord) on an un-established side invalid OR mask EDOMSK.

When having executed the processing of step S1003 or steps S1004, the buffer update circuit UPBF3 proceeds to step S1005. Also, when having executed the processing of step S1007 or step S1008, the buffer update circuit UPBF3 proceeds to step S1009. In step S1005, the buffer update circuit UPBF3 updates both the history AND mask AMSK and the history OR mask OMSK using formula F1 so as to exclude the variable C unrelated to the branch. That is, as mask target bits, the buffer update circuit UPBF3 updates bits corresponding to unrelated variables C in the history AND mask AMSK and the history OR mask OMSK as '0' (no AND/OR relationship), respectively. As described in FIG. 19, the mask target bit corresponding to the variable C unrelated to the branch (destination) is a bit which meets at least one of four conditions below.

The bit meeting a first condition is the one recorded in an overlapped manner on both the established side invalid AND mask TDAMSK and the un-established side invalid AND mask EDAMSK (the bits set to '1' (nullification enable) in both). The bit meeting a second condition is the one recorded in an overlapped way in both the established side invalid OR mask TDOMSK and the un-established side invalid OR mask EDOMSK. The variables which satisfy the third condition are the ones recorded in an overlapped manner on both the established side invalid AND mask TDAMSK and the established side invalid OR mask TDOMSK. The variable which fulfills the fourth condition is the one recorded in an overlapped manner on both the un-established side invalid AND mask EDAMSK and the un-established side invalid OR mask EDOMSK.

Moreover, in step S1005, as described above, with use of the formula F1, the buffer update circuit UPBF3 decides the mask target bits of the history AND mask AMSK. In addition, also with use of formula F2, the buffer update circuit UPBF3 decides the mask target bits of the history AND mask AMSK. According to the formula F2, when (HR, AMSK)=(F, 1), the value of the history AND mask AMSK is changed from '1' (with AND relationship) to '0' (without AND relationship). Also, in the remaining cases, the present state is maintained. As a result, based on step S1001, when the previous branch destination and the present branch destination are the same, the buffer update circuit UPBF3 updates the history AND mask AMSK such that the bit whose history record HR is 'F' (discord) in the prediction target bits may become a next mask target bit.

Here, for example, in a conditional branch program such as "if (A&B) then xx else yy", it is assumed that the previous branch destination and the present branch destination are both on the branch established (then) side. In this case, the variable values of the variables A and B are "TRUE" at both the previous time and this time. As a result, if there is a variable which has changed this time, the variable becomes the one unrelated to AND relationship. Therefore, by updating the history AND mask AMSK according to the formula F2, the variable is so changed as to be a next mask target bit (in other words, excluded from the next prediction target bits). At the next time, with use of a prediction method in steps S807a and S807b in FIG. 16, with respect to the variable corresponding to the updated prediction target bit, as long as there is no change in both the variables, the prediction preserving the present state (then) is performed.

Moreover, in step S1005, as described, the buffer update circuit UPBF3 defines a mask target bit of the history OR mask OMSK with the formula F1. In addition, the buffer update circuit UPBF3 defines a mask target bit of the history OR mask OMSK also by formula F3. According to the formula F3, when (HR, OMSK)=(F, 1), the value is the history OR mask OMSK is changed from '1' (OR related) to '0' (not OR related). Alternatively, when (HR, OMSK)=(F, 0), the value is changed from '0' to '1'. Also, in the remaining cases, the present state is maintained.

As a result, based on step S1001, when the previous branch destination and the present branch destination are the same, the buffer update circuit UPBF3 updates the history OR mask OMSK such that the bit whose history record HR is 'F' (discord) in the prediction target bits may become a next mask target bit. Furthermore, based on step S1001, when the previous branch destination and the present branch destination are the same, in the mask target bits, the buffer update circuit UPBF3 updates the history OR mask OMSK such that the bits whose history record HR is 'F' (discord) may become a next prediction target bit.

Here, in a conditional branch program such as "if (A1 B) then xx else yy", it is assumed that both the previous branch destination and the present branch destination are on the branch established (then) side. In this case, at the previous time and this time, the variable value of at least one of the variables A and B is "TRUE." Here, there is no telling to which the variable value of the variable changes between "TRUE" and "FALSE" in the previous time and this time in the history record HR. Therefore, particularly, it is not easy to determine whether or not a certain variable is OR related with high precision.

Therefore, in this example, in the prediction target bits (the bits whose history OR mask OMSK is '1'), the variable corresponding to the bit whose present history record HR is 'F' (i.e., the variables which has changed from the previous time) is regarded as a variables unrelated to OR relationship and is excluded from the next prediction target bits. Furthermore, in this example, in the mask target bits (i.e., the bits whose history OR mask OMSK is '0'), the variable corresponding to the bit whose present history record HR is 'F' is regarded as a variable related to OR relationship, and is defined as the next prediction target bit.

With respect to the latter, in a state where both the previous branch destination and the present branch destination are on the branch established (then) side, it is very likely that the variable value of the variable of (HR, OMSK)=(F, 0) is "TRUE." In this case, by excluding the variable from the mask target bits and changing it for a prediction target bit, it becomes possible to improve the branch prediction precision when, in fact, the variable is related OR relationship. That is, next time, with use of the prediction method of steps S808a and S808b of FIG. 16, with respect to the variables of the prediction target bits, unless there is change in at least one of the variables, there is performed prediction of preserving the present state (then). When the variable value of the variable to be related to OR relationship is "TRUE", in fact, unless there is change in the variable, the branch destination is preserved (then) as it is. In addition, when a variable changed to the prediction target bit is, in fact, unrelated to OR relationship, the variable is again returned to the mask target bit by the formula F3 and the like at one of the subsequent stages.

In step S1009, being different from the case of step S1005, the buffer update circuit UPBF3 updates the branch success/failure prediction BRP by the branch success/failure result BRPr. Accordingly, a direction of the branch destination prediction (branch destination when the present state is preserved) changes next time. Moreover, in step S1009, as in step S1005, by the formula F1, the buffer update circuit UPBF3 defines the mask target bits of the history AND mask AMSK. In addition, the buffer update circuit UPBF3 defines a mask target bit of the history AND mask AMSK also with formula F4.

In the formula F4, when (HR, OMSK)=(T, 1), the value of the history AND mask AMSK is '0' and, in the rest of the case, the value becomes '1'. As a result, based on step S1001, when the previous branch destination and the present branch destination are different, the buffer update circuit UPBF3 updates the history AND mask AMSK such that the mask target bit (bit of OMSK='1') based on the history OR mask OMSK becomes a prediction target bit (bit of AMSK='1') based on the next history AND mask AMSK. Moreover, in the prediction target bits (bit of OMSK='1') based on the history OR mask OMSK, the buffer update circuit UPBF3 updates the history AND mask AMSK such that the bits whose history record HR is 'F' (discord) become the prediction target bit (bit of AMSK='1') based on the next history AND mask AMSK.

Here, in a conditional branch program such as "if (A|B) then xx else yy", it is assumed that the previous branch destination is on the branch established (then) side and the present branch destination is on the branch un-established (else) side. In this case, the variable values of variables A and B are both "FALSE", as a result of at least one of them has changed to "FALSE" this time. In this state, it becomes useful to perform branch prediction by replacing the program with AND relationship such that "a branch destination is maintained as it is (else) as long as both the variable values of the variables A and B maintain 'FALSE'." Therefore, in the prediction target bits by the history OR mask OMSK, the history AND mask AMSK of the variable whose history record HR is 'F' (changed from the last time) is defined as '1'.

As long as there is no change in both the variables, for the next time, a prediction of preserving present state (else) is performed with respect to the variables corresponding to the prediction target bits using the prediction method of steps S807a and S807b in FIG. 16. Thus, when the previous branch destination and the present branch destination are different, it becomes possible to perform the prediction in the case of having OR relationship with high precision by replacing the presumed prediction with the AND relationship.

Moreover, as in the case of step S1005, the buffer update circuit UPBF3 defines a mask target bit of the history OR mask OMSK according to the formula F1 and, in addition, defines the mask target bit of the history OR mask OMSK according also to formula F5. In the formula F5, when HR='T', the value of the history OR mask OMSK is '0' and, when HR='F', the value is '1'. As a result, based on step S1001, when the previous branch destination and the present branch destination are different, in the history bit region SREG, the buffer update circuit UPBF3 updates the history OR mask OMSK such that the bits whose history record HR is 'F' (discord) may become a next prediction target bit.

Here, in a conditional branch program such as "if (A&B) then xx else yy", it is assumed that the last branch destination is on the branch established (then) side and the present branch destination is on the branch un-established (else) side. In such a case, as to the variable values of the variables A and B, at least one of them is turned to "FALSE" this time. In this situation, as long as one of the variable values of the variables A and B holds "FALSE", the branch destination remain in the present state (else), it is beneficial to perform branch prediction by replacing it with OR relationship such as "a branch destination is maintained as is (else)". Therefore, '1' is given to a history OR mask OMSK of the variable whose history record HR is 'F' (changed from the previous time).

Subsequently, using the prediction method shown in steps S808a and S808b of FIG. 16, with respect to variables of the prediction target bits, unless at least one of the variables changes, the prediction holding the present state (else) is performed. Thus, when the previous branch destination and the present branch destination are different, by replacing the prediction based on AND relationship with OR relationship, it becomes possible to perform the prediction in the case of the AND relationship with high precision.

Execution Example of Conditional Branch Program

FIG. 20 is a diagram showing one example of execution progress of a conditional branch program using the processor unit of FIG. 15. In this regard, an instruction code similar to those in FIG. 2 and the like is executed. However, unlike the case of FIG. 2 and the like, the history bit region SREG (history record HR) is of 3 bit, and an equivalent value judgment is given to three variable "IO1", "IO2", and "IO3". Further, in this regard, such processing is performed that when an OR calculation result of the variables "IO1" and the variable "IO2" is not zero, the branch is established (loop processing is performed). In other words, when at least one of the variable values (load data DT) corresponding to "IO1" and "IO2" is 'T' (='1'), the branch is established.

When time t=t1-t3, the load data DT of (I03, I02, IO1) is (F, T, T). In the conditional branch instruction of time t=t5 ("bnz (XX)"), there is no entry for the branch destination buffer BRBF3, and branch destination prediction is not performed. When time t=t6, since both the load data DT corresponding to "IO1" and "IO2" are 'T', a branch success/failure result BRPr is "established". Corresponding to this, a branch success/failure prediction BRP is also "established". Moreover, each history mask (AMSK, OMSK) and each invalid mask (TDAMSK, TDOMSK, EDAMSK, EDOMSK) are initialized using the value described in step S911 of FIG. 17.

When time t=t7 to t9, the load data DT of (103, 102, 101) are (F, F, F). Accordingly, the history record HR becomes (T, F, F). When there is a conditional branch instruction of time t=t11 ("bnz (XX)"), a history record HR corresponding to a bit whose history AND mask AMSK being '1' (with AND relationship) includes 'F' (discord) (steps S807a and S807b of FIG. 16). Moreover, history OR masks OMSK all indicate '0' (no OR relationship) (steps S808a and S808b). For this reason, there is predicted a branch destination ("un-established") different from the previous branch destination ("established" shown by the branch success/failure prediction BRP) (step S411-step S412 in FIG. 16).

When time t=t12, both the load data DT corresponding to "IO1" and "IO2" are 'F'. Therefore, the branch success/failure result BRPr is "un-established" and the branch destination prediction is a hit. Moreover, in FIG. 18, since BRP≠BRPr and BRP="established", processing shown in steps S1007 and S1009 is performed. In step S1007, an established side invalid OR mask TDOMSK is updated as (1, 0, 0). However, since other invalid masks are (0, 0, 0), formula F1 in step S1009 does not record variables unrelated to the branch. Moreover, in step S1009, in accordance with formula F5, the history OR mask OMSK is updated as (0, 1, 1). In accordance with the branch success/failure prediction BRPr, the branch success/failure prediction BRP is updated as being "un-established".

When time t=t13 to t15, the load data DT of (IO3, IO2, IO1) is (F, F, T). Accordingly, the history record HR becomes (T, T, F). On the occasion of the conditional branch instruction ("bnz (XX)") of time t=t17, 'F' (discord) is included in the history record HR corresponding to the bit whose history AND mask AMSK is '1' (with AND relationship) (steps S807a and S807b). Moreover, 'T' (accord) is included in the history record HR corresponding to the bit whose history OR mask OMSK is '1' (with OR relationship) (steps S808a and S808b). Therefore, the same branch destination ("un-established") as the previous branch destination ("un-established" shown by the branch success/failure prediction BRP) is predicted (step S409→S412).

When time t=t18, the load data DT corresponding to "IO1" is 'T'. Therefore, the branch success/failure result BRPr is "established", and the branch destination prediction becomes a prediction miss. Moreover, in FIG. 18, BRP !=BRPr and BRP="being un-established". Therefore, the processing of steps S1008 and S1009 is executed. In step S1008, the un-established side invalid OR mask EDOMSK is updated as (1, 1, 0).

Corresponding to the un-established side invalid OR mask EDOMSK (1, 1, 0) and the established side invalid OR mask TDOMSK (1, 0, 0) updated at time t=t12, the formula in step S1009 records a variable (variable corresponding to the bits both being '1') unrelated to the branch. Moreover, in step S1009, corresponding to the formulas F1 and F4, the history AND mask AMSK is updated as (0, 0, 1). Further, according to the formulas F1 and F5, the history OR mask OMSK is updated as (0, 0, 1). The branch success/failure prediction BRP is updated as "established" according to the branch success/failure result BRPr.

When time t=t19 to t21, the load data DT of (103, 102, 101) is (T, T, F). Corresponding to this, the history record HR becomes (F, F, F). On the occasion of the conditional branch instruction ("bnz(XX)") of time t=t23, 'F' (discord) is included in the history record HR corresponding to the bit whose history AND mask AMSK is '1' (with AND relationship) (steps S807a and S807b). Moreover, 'T' (accord) is not included (steps S808a and S808b) in the history record corresponding to the bit whose history OR mask OMSK is '1' (with OR relationship). For this reason, there is predicted a branch destination ("un-established" which is different from the previous branch destination ("established" shown by the branch success/failure prediction BRP) (step S411→S412)

When time t=t24, the load data DT corresponding to "IO2" is 'T'. Therefore, the branch success/failure result BRPr comes to be "established", and the branch destination prediction becomes a prediction miss. Moreover, in FIG. 18, BRP=BRPr, and BRP="established". Therefore, the processing of steps S1003 and S1005 is performed. In step S1003, the established side invalid AND mask TDAMSK is updated as (1, 1, 1).

Thus, the established side invalid AND mask TDAMSK is updated as (1, 1, 1). However, the un-established side invalid AND mask EDAMSK and the established side invalid OR mask TDOMSK are (0, 0, 0) and (1, 0, 0), respectively. Therefore, the variables unrelated to the branch recorded according to the formula F1 in step S1005 remains as they are when the time t=t18. Moreover, in step S1005, according to the formulas F1 and F2, the history AND mask AMSK is updated as (0, 0, 0). According to the formulas F1 and F3, the history OR mask OMSK is updated as (0, 1, 0).

When time t=t25 to t27, the load data DT of (IO3, IO2, IO1) is (T, T, T). Corresponding to this, the history record HR is (T, T, F). When there is a conditional branch instruction ("bnz (XX)") of time t=t29, the history AND masks AMSK are all '0' (no AND relationship) (steps S807a and S807b). Moreover, 'T' (accord) is included in a history record HR corresponding to the bit whose history OR mask OMSK is '1' (with OR relationship) (steps S808a and S808b). For this reason, the same branch destination ("established") as the previous branch destination ("established" as shown by the branch success/failure prediction BRP) is predicted (step S409→step S410).

When time t=t30, both the load data DT corresponding to "IO1" and "IO2" are 'T'. Therefore, the branch success/failure result BRPr is "established" and the branch destination prediction is a prediction hit. Moreover, in FIG. 18, since BRP=BRPr and BRP="established", processing of steps S1003 and S1005 is performed. In step S1003, the established side invalid AND mask TDAMSK maintains (1, 1, 1) as it is. Moreover, in step S1005, according to the formulas F1 and F3, the history OR mask OMSK is updated as (0, 1, 1).

Major Effects of Third Embodiment

As described above, in addition to the various effects described in First Embodiment, the system of Third Embodiment enables the following. That is, since the variables related to the branch destination are narrowed down considering the relationships (AND relationship and OR relationship) thereof and the branch destination prediction can be performed depending on each relationship, it becomes possible to further raise the hit rate of the branch destination prediction. In the example of FIG. 20, when time t=t18, the variable ("IO3") unrelated to the branch destination is defined as the mask target bit of the history AND mask AMSK and the history OR mask OMSK. Moreover, the two variables ("IO1" and "IO2") used for deciding the branch destination by OR calculation are defined as prediction target bits of the history OR mask OMSK when time t=t30. Also, on the other hand, the two variables ("IO1" and "IO2") are defined as mask target bits of the history AND mask AMSK. Thus, hereafter, as long as either of the two variables ("IO1" and "IO2") maintains 'T', the branch destination prediction preserving the present status is performed and, also, the branch destination prediction becomes a hit.

Although the invention made by the present inventors has been described specifically on the basis of the preferred embodiments, the present invention is not limited to the embodiments referred to above. It is needless to say that various modifications can be made thereto within the scope not departing from the gist thereof. For example, the embodiments described above are explained in detail to make the invention intelligible, but the invention is not limited to the ones provided with all the configurations that are described. Moreover, part of the configuration of one embodiment can be replaced with the configuration of another embodiment. Further, the configuration of one embodiment can be additionally provided with the configuration of another embodiment. Still further, as to part of a configuration of each embodiment, adding, eliminating, and replacing with another configurations can be provided.

For example, the formulas shown in the drawings of Embodiments 1 to 3 described above (for example, the formulas of step S407 in FIG. 10) are not particularly limited to those and can be modified, as required, so long as they are formulas to be the same as the truth tables. Moreover, as the case may be, in steps S1005 and S1009 of FIG. 18, formulas to be other truth tables can also be employed. That is, although these formulas (F3 and the like in particular) are formulas based on the assumption, in fact, the assumption can be done with use of various methods. Further, according to the methods, the formulas can be variably modified. Moreover, in steps S1005 and S1009, as the formulas F1 to F5, it is possible that not all of them but some of them are adopted. Furthermore, for example, in the formula F1, there is no need to combine four AND formulas (each being AND formulas including two invalid masks) and, as the case may be, some of them can be combined.

What is claimed is:

1. A processor device, comprising:
   a data cache;
   an equivalent value judgment circuit that judges, every time a load instruction to the data cache is executed, accord or discord of previous load data from a line corresponding to the load instruction and present load data;
   a judgment history record circuit which records, in an N bit region (N being an integer of 1 or larger), all of judgment results of N times by the equivalent value judgment circuit as history records, respectively, before executing a conditional branch instruction;
   a branch prediction circuit which predicts, when the conditional branch instruction is executed, based on the history records in the N bit region, 1) a first branch destination being a same branch destination as a previous branch destination obtained by a previous execution result of the conditional branch instruction or 2) a second branch destination being different from the previous branch destination, and issues an instruction fetch direction of one of the predicted first branch destination and the predicted second branch destination; and
   a processor main-body circuit 1) that, when executing the conditional branch instruction, fetches an instruction, in advance, of the predicted first branch destination or the predicted second branch destination in response to the instruction fetch direction from the branch prediction circuit, and 2) that, when a present branch destination obtained by a present execution result of the conditional branch instruction is different from a previous predicted branch destination, nullifies the instruction fetched in advance.

2. The processor device according to claim 1, wherein when the history records in the N bit region all indicate accord, the branch prediction circuit predicts the first branch destination, and
   wherein when any one of the history records in the N bit region indicates discord, the branch prediction circuit predicts the second branch destination.

3. The processor device according to claim 1,
   wherein the data cache includes a first data storage region storing the present load data and a second data storage region storing the previous load data, loads the present load data from the first data storage region according to the load instruction and updates the second data storage region using the present load data, and
   wherein, every time the load instruction is executed, the equivalent value judgment circuit judges accord or discord of data of the first data storage region and data of the second data storage region.

4. The processor device according to claim 1, further comprising an instruction address of the conditional branch instruction and a branch destination buffer in which a relationship to information on the previous branch destination is registered,
   wherein the branch prediction circuit refers to the branch destination buffer and determines an instruction address of the first branch destination or the second branch destination.

* * * * *